United States Patent
Levy et al.

(10) Patent No.: US 8,005,847 B2
(45) Date of Patent: Aug. 23, 2011

(54) PATTERN-BASED FILE RELATIONSHIP INFERENCE

(75) Inventors: Philip Levy, Los Altos, CA (US); Richard Cohn, Newton, MA (US)

(73) Assignee: Adobe Systems Incorporated, San Jose, CA (US)

( * ) Notice: Subject to any disclaimer, the term of this patent is extended or adjusted under 35 U.S.C. 154(b) by 217 days.

(21) Appl. No.: 11/584,218

(22) Filed: Oct. 20, 2006

(65) Prior Publication Data

US 2008/0097953 A1 Apr. 24, 2008

(51) Int. Cl.
G06F 7/00 (2006.01)
G06F 17/30 (2006.01)

(52) U.S. Cl. ..................................................... 707/755
(58) Field of Classification Search ............... 707/6, 755
See application file for complete search history.

(56) References Cited

U.S. PATENT DOCUMENTS

| | | | | |
|---|---|---|---|---|
| 5,412,808 | A * | 5/1995 | Bauer | 707/1 |
| 5,640,558 | A * | 6/1997 | Li | 707/101 |
| 5,926,652 | A * | 7/1999 | Reznak | 712/300 |
| 6,092,065 | A | 7/2000 | Floratos et al. | |
| 6,393,477 | B1 * | 5/2002 | Paxhia et al. | 709/223 |
| 6,785,677 | B1 | 8/2004 | Fritchman | |
| 6,799,302 | B1 * | 9/2004 | Sites | 715/210 |
| 7,246,129 | B2 * | 7/2007 | Lawrence et al. | 1/1 |

| | | | |
|---|---|---|---|
| 2002/0129347 | A1 | 9/2002 | Fischer |
| 2005/0251737 | A1 | 11/2005 | Kobayashi et al. |
| 2005/0267871 | A1 | 12/2005 | Marchisio et al. |

FOREIGN PATENT DOCUMENTS

WO  WO-2008051791 A2  5/2008
WO  WO-2008051791 A3  5/2008

OTHER PUBLICATIONS

"Office open XML", http://en.wikipedia.org/wiki/Office_Open_XML, (Accessed Jun. 28, 2007), 12 pgs.
"Open packaging convention", http://en.wikipedia.org/wiki/Open_Packaging_Convention,(Accessed Jun. 28, 2007), 2 pgs.
"Regular expression", http://en.wikipedia.org/wiki/Regular_expression, (Accessed Jun. 28, 2007), 12 pgs.
"Standard ecma 376 office open XML file formats", http://www.ecma-international.org/publications/standards/Ecma-376.htm, (Dec. 2006),2 pgs.
"XML paper specification", http://en.wikipedia.org/wiki/XML_Paper_Specification (Accessed Jun. 28, 2007),3 pgs.
"XPS team blog", http://blogs.msdn.com/xps/archive/2006/09/01/735865.aspx (Accessed Jun. 28, 2007),1 pg.

(Continued)

*Primary Examiner* — Greta L Robinson
*Assistant Examiner* — Jeffrey Chang
(74) *Attorney, Agent, or Firm* — Schwegman, Lundberg & Woessner, P.A.

(57) ABSTRACT

In an example embodiment, a method comprising accessing a relationship definition associated with a package of data items, the relationship definition including a template string and a first pattern string including a first wildcard symbol, accessing a main file name of a main file, matching the main file name to the first pattern string including associating the first wildcard symbol with a substring of the main file name, and deriving a second pattern string from the template string.

32 Claims, 15 Drawing Sheets

OTHER PUBLICATIONS

"International Application Serial No. PCT/US07/81766, International Search Report mailed Mar. 31, 2008", 4 pgs.

"International Application Serial No. PCT/US07/81766, Written Opinion mailed Mar. 31, 2008", 4 pgs.

* cited by examiner

PATTERN-BASED FILE RELATIONSHIP INFERENCE

FIELD

This application relates to a method and system to enable management of semantic relationships between electronic files, and, in one example embodiment, to enable management of semantic relationships between files based on file name characteristics using wildcard and pattern-based relationship management.

BACKGROUND

In recent years, developers of electronic document and electronic content management systems have attempted to find ways of efficiently and robustly storing compound electronic documents. These compound documents are typically constructed from a number of component files of various types and the component files are typically stored together in a single package or a single section of a directory tree in a file system.

An example of such a system is that of a collection of files used to provide World Wide Web pages. Typically, all the files needed to provide a web of pages are located in a single file system directory and a number of sub-directories, with a single HTML file named "index.html" acting as the main document. The web of pages is constructed by adding hypertext references within files that refer to other files, either by relative or absolute path names. Other compound document systems have followed this general model, in which supplemental files associated with a main document file are referenced explicitly within the main document file. However, when supplemental files are associated with a main document file by the inclusion of explicit links from the main document file to the supplemental files, inflexibility results. For example the association between a main file and its supplemental files cannot be changed or edited without editing the main file.

This problem is exacerbated in the case of the main file being a signed document. When a main file is to be associated with one or more supplemental files and the main document is signed with a digital signature, links included in the main document and referencing supplemental files cannot be added or edited without rendering the digital signature invalid.

BRIEF DESCRIPTION OF DRAWINGS

Some embodiments are illustrated by way of example and not limitation in the figures of the accompanying drawings in which.

DETAILED DESCRIPTION

Figure 1:
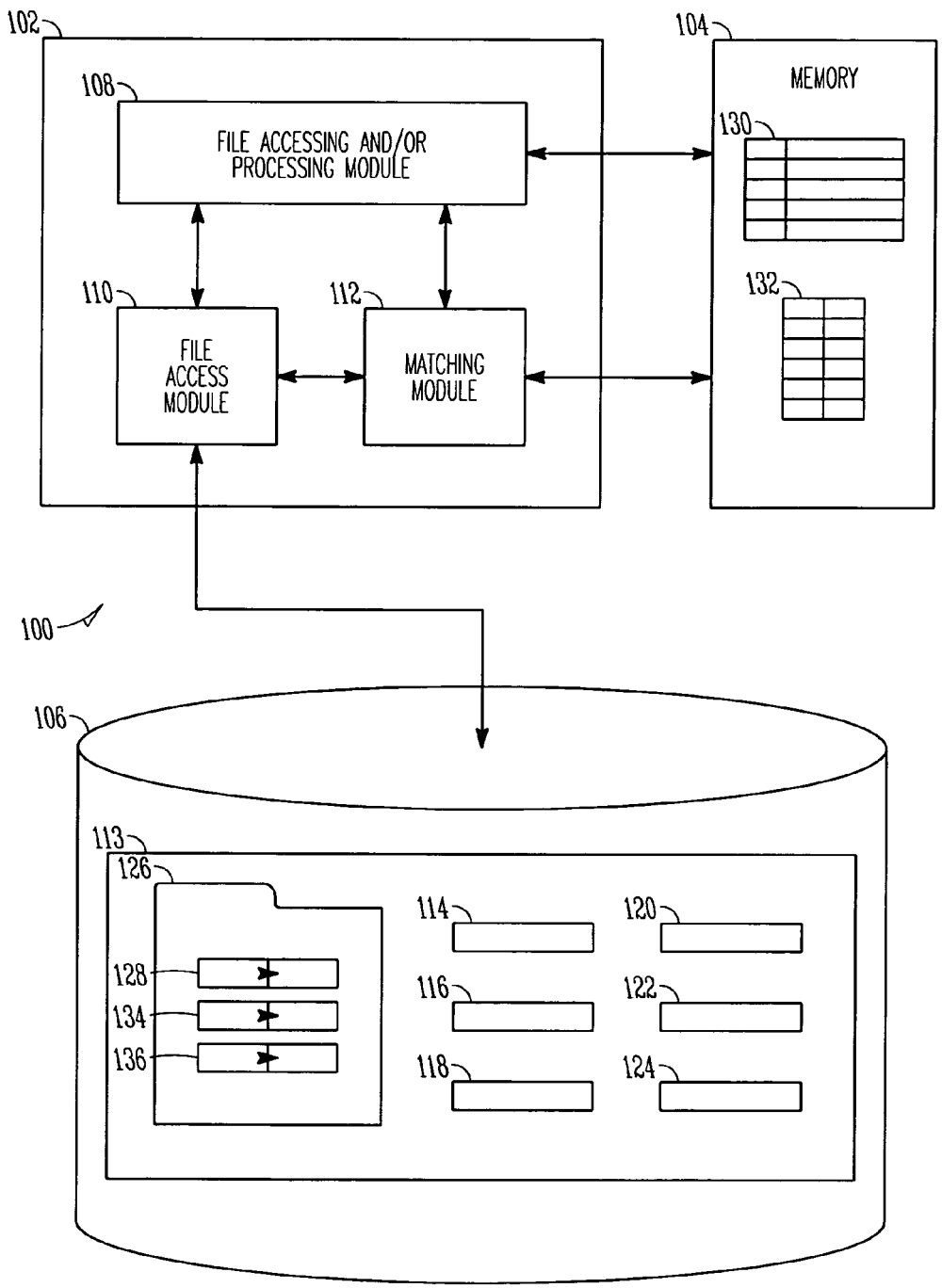
FIG. 1 is a diagrammatic representation of a system for processing pattern based file relationship inferences, according to an example embodiment.

In the following description, for purposes of explanation, numerous specific details are set forth in order to provide a thorough understanding of some example embodiments. It will be evident, however, to one skilled in the art that the present invention may be practiced in other embodiments without these specific details.

Embodiments may, for example, be implemented as a stand-alone application (e.g., without any network capabilities), a client-server application or a peer-to-peer (or distributed) application. Embodiments may also, for example, be deployed by Software-as-a-Service (SaaS), Application Service Provider (ASP), or utility computing providers, in addition to being sold or licensed via traditional channels.

INTRODUCTION

One technique to associate various files via extra-file relationships (particularly when the various files that may be associated are in a single package or other repository) is to include a "relationships file" in the repository. This relationships file typically includes a list of all the inter-file relationships having a number of entries. Each entry in such a relationship file explicitly mentions the filenames of the files participating in the relationship as well as the name or other indication of the nature of the relationship. For example, the relationships file may include a series of relationship entries, where each relationship entry is a pairing between a main file name and one or more related file names, and an indication of the nature of the relationship represented.

This type of relationships file mechanism, however, is cumbersome because it is necessary to explicitly list every pair of related files as a separate entry. For example, suppose that file A is associated to file B and C and file D is associated by the same relationship to file E and F. In this type of relationships file mechanism, the relationships between AB, AC, DE and DF must all be listed explicitly in the relationships file in separate entries. If other files are added to the package and it is desired that the same type of relationship be established among those new files, it is necessary to edit the relationships file to add new relationship entries concerning the newly added files. Furthermore, when it is desired to determine whether a particular file is related to other files within the package, it may typically be necessary to traverse the entire relationships file to determine whether the file of interest participates in a relationship and if so, with which other file(s). This is an inefficient technique.

For the purposes of this specification, the term "relationship" shall be taken to include any semantic or semiotic linkage or association between two or more data items. For the purposes of this specification, the term "data item" shall be taken to include any data structure that is separately identifiable and/or storable in a computer-readable medium. Examples of data items include files, file folders, electronic documents, artifacts of computer code, named objects and the like. Data items may be grouped or assembled into "packages" of data items. Packages may be user-defined arbitrary groups of data items, or may be defined by location or aggregation within a file system or other storage structure. Some examples of packages include a single directory, a directory sub-tree of a hierarchically arranged file system and compressed-directory sub-tree files such as, for example, ZIP files. Such compressed-directory sub-tree files are treatable for such purposes as single files, but may contain some or all of a directory sub-tree of a hierarchically arranged file system within them, in some embodiments, stored so that files and/or folders are processed when added to the file by compression algorithms to reduce their size without loss of data.

WinZip Computing, Inc. produces software called Win-Zip® that creates, compresses, stores, and facilitates accessing of compressed-directory sub-tree files. This product is based on the Zip specification published by PKWare, Inc. at http://www.pkware.com/business_and_developers/developer/appnote/

A package of data items may include or otherwise be associated with one or more files providing relationship definitions. These relationship definitions may serve to indicate a class or category of relationships between data items included in the package, as will be described in detail below. These relationship definitions may also include information on the nature of the relationship specified by the relationship definition.

For the purposes of this specification, the term "electronic document" may be taken to include various types of data structures that represent printable artifacts in which an on-screen rendering of the data structure substantially corresponds to the printed version of the data structure. A "page description language document" may be taken, for purposes of this specification, to include electronic documents in which the electronic document is defined by a description of its content using a page description language and organized into one or more printable pages.

For the purposes of this specification, the term "digital signature" may be taken to indicate any type of data associated with a data item (e.g., a file or other electronic document) which may serve to evidence the authenticity of the data item or to prove that the data item has not been altered since the digital signature was produced with respect to the data item.

For the purposes of this specification, the term "electronic document rendering application" shall be taken to include various software applications which have the capability to depict or render an electronic document on a computer display screen or onto other media.

A given string may be matched against a pattern string. If every character in the given string matches the corresponding character of the pattern string, the given string is said to match the pattern string. In addition to literal characters, pattern strings may also include "wildcard symbols." These wildcard symbols may be included in the pattern string where the wildcard symbols can serve to match various combinations of characters in the given string. Some examples of wildcard symbols are the star or asterisk symbol (e.g., *) which may match a contiguous string of one or more characters in a given string and the question mark wildcard (e.g., ?, ??, ???, etc.) symbol in which a particular number of question marks comprising a wildcard symbol will match any substring having the same number of characters in a given string.

For the purposes of this specification, the terms "main file" and "related file" are used to identify two data items in which the related file is related according to a particular relationship to the main file. The main file may have a main filename by which it may be identified and the related file(s) may each have a related file name by which they may be identified. A "literal substring", for the purposes of this specification, shall be taken to include a contiguous subset having at least one character and included in a given string.

For the purposes of this specification, the term "module" includes an identifiable portion of code, data, or computational object to achieve a particular function, operation, processing, or procedure.

Some embodiments may be used to record relationships between main files and related files separately from the files themselves. In some embodiments, this may be desirable to allow information (e.g. located in a related file) to be associated with the source file without changing the source file, for example, when a digital signature included in the main file is to be preserved, or when the main file is stored on a read-only medium (e.g., a compact disc (CD) or the like.) Some embodiments may use pattern strings to make relationships among files explicit without requiring storing or maintaining relationship data about every relationship instance.

Example System for Carrying Out File Relationship Inference Methods

FIG. 1 illustrates an example embodiment of a system for doing pattern-based file relationship management, according to an example embodiment. The system illustrated in FIG. 1 is indicated in general as system 100. System 100 includes an application 102 which may, in some embodiments, be an application program, such as, for example, an electronic document rendering or editing application. System 100 also includes a memory 104 and a storage device 106 such as, for example, a disk drive or secondary memory. Among the various modules and components of the application 102 are included a file accessing and/or processing module 108, a file access module 110, and a matching module 112. The matching module 112 and the file accessing and/or processing module 108 may be operatively connected to the memory 104. The file access module 110 may be operatively connected to the storage device 106. The file accessing and/or processing module 108, the file access module 110, and the matching module 112 may be operatively connected to one another to facilitate communication, such as method invocation and data interchange.

One or more packages of data items such as package 113 may be stored in the storage device 106. The package 113 may include a number of files or other data items 114, 116, 118, 120, 122, and 124 which may be arranged in various subfolders or other organizing mechanisms. The package 113 may also include a relationship definition file 126. Within this relationship definition file are stored one or more relationship definitions 128, 134, and 136. The relationship definition file 126 may thus provide relationship information describing the relationships among the various data items (e.g., files) 114-124 in the package 113. The relationship information and its structure and semantics are described in further detail below.

The memory 104 may include two data tables, 130 and 132. Data table 130 may be used by the matching module 112 to store the substrings associated with various name portion symbols. Data table 132 may be used by the matching module 112 to store pairings between wildcard symbols in a first pattern string with substrings of a main file name. These functions of the matching module 112 are be described in more detail below.

Example Data Structures Amenable to Relationship Inference

Figure 2:
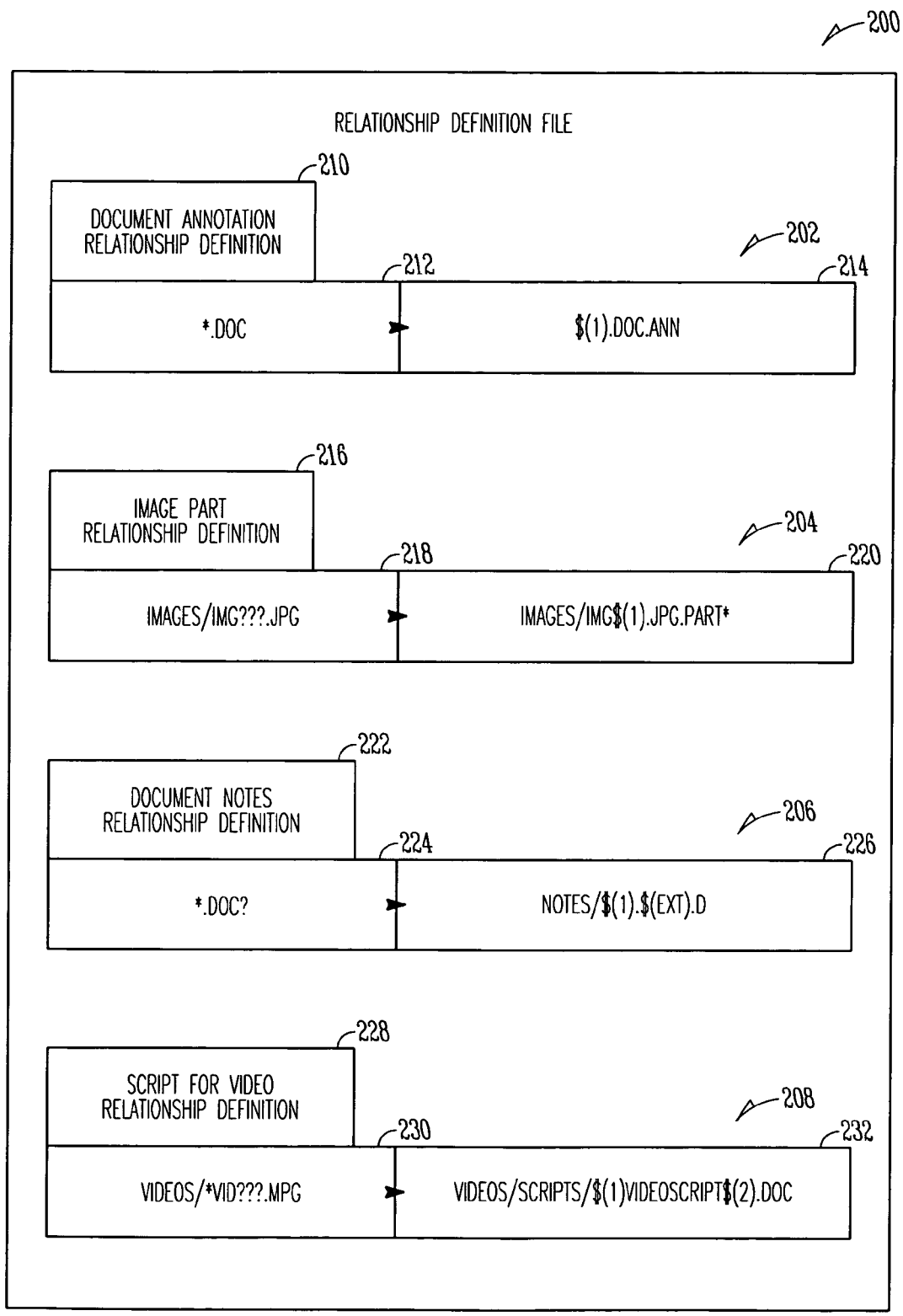
FIG. 2 is a diagrammatic illustration of an example relationship definition file, according to an example embodiment.
Figure 3:
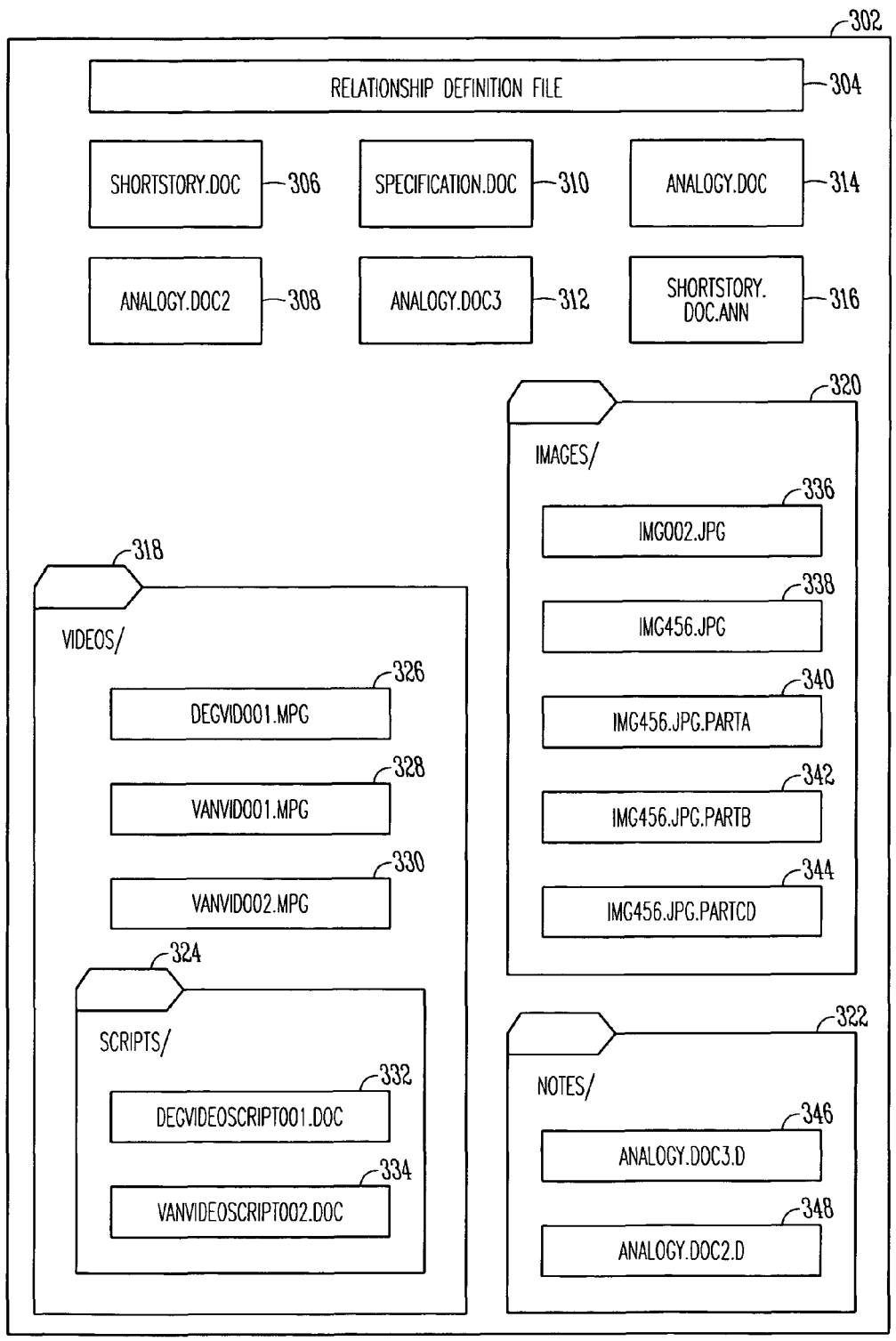
FIG. 3 is a diagrammatic illustration of a data package containing a relationship definition file as well as a number of files and subfolders, according to an example embodiment.

FIG. 2 and FIG. 3 illustrate a relationship definition file 200 according to an example embodiment and a package 302 of data items according to an example embodiment, respectively. Various example relationship definitions are illustrated in the relationship definition file 200 of FIG. 2 as well as various files and subfolders illustrated in the example package 302 of FIG. 3. The parts depicted in FIG. 2 and FIG. 3 are used below to illustrate various example methods and processes.

The relationship definition file 200 of FIG. 2 includes, by way of example, four relationship definitions, labelled 202, 204, 206 and 208 respectively. In some embodiments, relationship definitions associated with a package 302 may be contained in multiple relationship definition files or may be contained in some other data structure associated with a package of data items. For purposes of illustration, the four relationship definitions shown in FIG. 2 are labelled with text boxes 210, 216, 222 and 228 respectively to illustrate the nature of the relationship defined. These text boxes may be taken to illustrate information identifying the relationship definition or the nature of the relationship that may, in some embodiments, be associated with, or included in, relationship definitions. The relationship definitions 202, 204, 206 and 208 each include a first pattern string 212, 218, 224 and 230 respectively and a template string 214, 220, 226 and 232 respectively.

In some embodiments, the semantics of the relationship definitions, taking as an example relationship definition 202, are as follows. A file (or other data item) in a package 302 of data items whose file name matches the wildcard containing first pattern string 212, such as for example specification.doc, analogy.doc and other files matching the pattern string 212, may be taken as related, according to the nature of the relationship (e.g., as indicated in text box 210), to corresponding files ending in .doc.ann. For example, suppose there is an electronic document called specification.doc, the relationship definition 202 indicates that a file named specification-.doc.ann stored in the same package as specification.doc is related to specification.doc in the sense of being an annotation file which may include annotation information related to the main specification.doc named file. Relationship definitions 204, 206 and 208 are discussed in more detail below with respect to example processes illustrated in FIGS. 4 through 8.

In some embodiments, one or more relationship definitions may be directional in that they may specify how to map from one or more main files to one or more related files, but need not specify the reverse direction. Accordingly, in some embodiments, a main file may be termed a "source file" and a related file may be termed a "destination file."

FIG. 3 illustrates a package 302 of data items including a number of files in the top level of the package as well as a number of files in sub and sub-subfolders in the data package. The package 302 includes a relationship definition file 304 such as that illustrated as relationship definition file 200. In addition, six files of varying types, electronic document files 306, 310, 314, 308 and 312 as well as a document annotation file 316 are included as top level files in the package 302. The example package 302 also includes several folders 318 (labeled videos), 320 (labeled images), 322 (labeled notes) and 324 (labeled scripts). Subfolder 324 is a subfolder of folder 318. The videos folder 318 includes three example MPEG video files DEGvid001.mpg 326, VANvid001.mpg 328 and vanvid002.mpg 330. In the example package 302, the scripts subfolder of the videos folder includes two scripts 332 and 334 that are associated with two of the videos in the videos folder 318. The images folder in example package 302 includes five JPEG images 336, 338, 340, 342 and 344. The package 302 also includes a notes file including two note relation files 346 and 348.

Pattern-Based File Relationship Inference Examples

Figure 4:
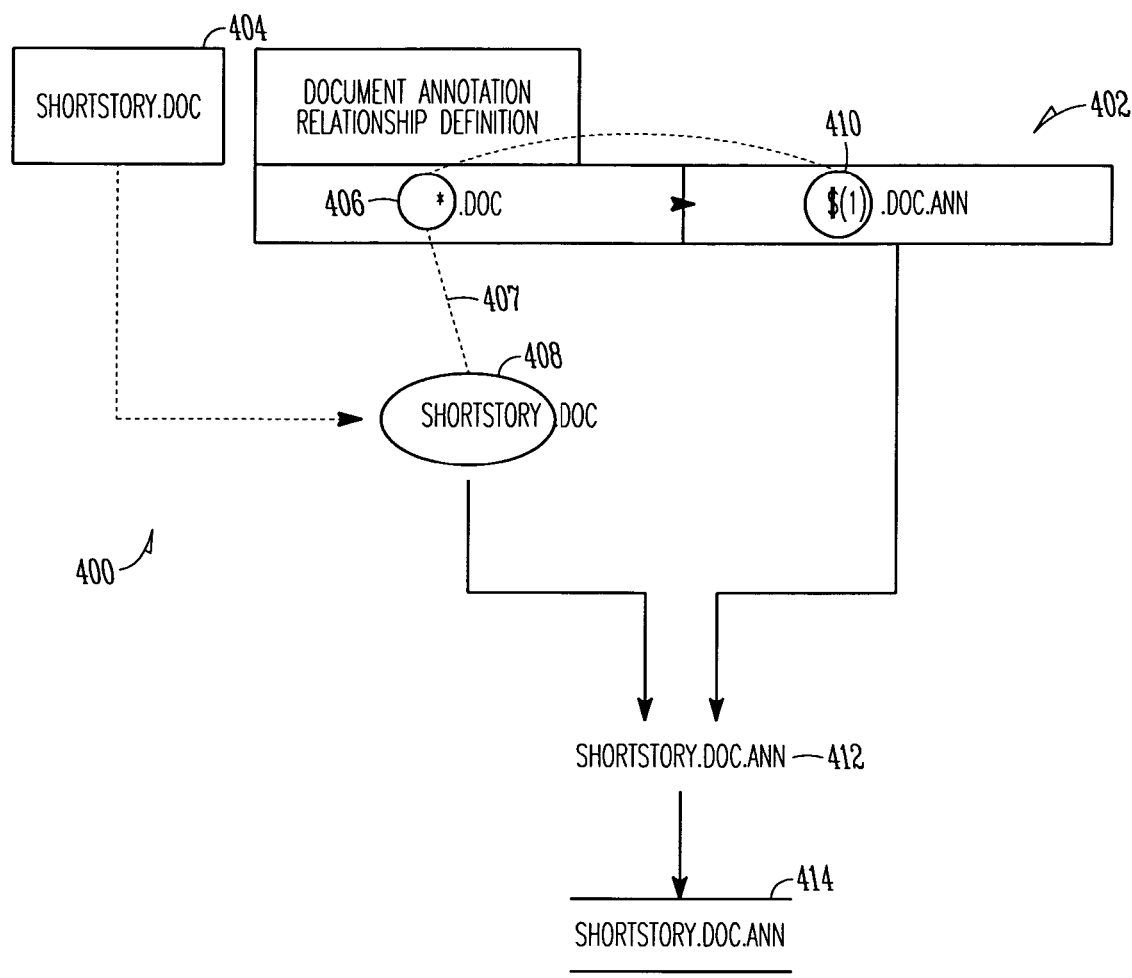
FIG. 4 is a diagrammatic representation of a process for determining of a list of files related to a main file, according to an example embodiment.

FIG. 4 illustrates a process 400 by which one or more files (or, in some embodiments, other data items) related to a main file may be identified, on the basis of the file name of the main file and relationship definition information, according to an example embodiment. Suppose, for purposes of illustration, that it is desired to know the names of annotation files in a package 302 that are related according to relationship definition 202 of relationship definition file 304 to a particular document file (e.g., files that serve to contain information annotating the document file). Such an identification of related annotation files may be used, for example, by a word processing application, electronic document rendering application or other document processing application with respect to a particular document. In some embodiments, these annotation files may provide supplemental data to be integrated into a rendition of the document file.

Suppose, for example, that an application program needs to identify all the files in the package 302 of data items that are related by the document annotation relationship to a particular file, for example, shortstory.doc 306. Such a file identification process is generally designated as 400. In order to identify a list of annotation files related to a main document file 404 via a relationship represented by a relationship definition 402, the file access module 110 may access the filename associated with the main document file 404, as well as the relationship definition 402. It will be appreciated that the relationship definition 402 includes a left hand side including a first pattern string and a right hand side including a template string. It will be further appreciated that the left hand side of the relationship definition 402 includes a pattern string including a wildcard symbol, which in the example relationship definition 402 is the asterisk (*) symbol. For purposes of illustration, the asterisk wildcard symbol may be taken as able to match any corresponding substring of the filename of the main file. This asterisk wildcard symbol indicated by ellipse 406 corresponds to a wildcard identifying symbol $(1) indicated by ellipse 410.

The main filename of the main document file 404 and the relationship definition 402 are accessed by the file access module 110. The matching module 112 may, in some embodiments, thereafter attempt to match the first filename with the first pattern string. In the example process 400, this matching attempt is successful. This success is illustrated by two graphical elements in FIG. 4. First, by the straight dotted line 407 connecting the ellipse 406 indicating the wildcard symbol in the first pattern string with a corresponding substring of the main filename indicated by the ellipse 408. Second, by the literal matching between the .doc extension in the first pattern string and the .doc extension of the first filename. This match having may be made, in some embodiments, by the matching module 112. The matching module 112 may store the association between the wildcard symbol (e.g., "*") and the substring that is in fact matched to the wildcard (e.g., "shortstory") in a table 132 in memory 104. The matching module 112 may then proceed to derive a second pattern string from the template string, as illustrated by the two curved downward pointing arrows in FIG. 4.

In the process 400, a second pattern string 412 that may be derived from the template string and the main file name (e.g. "shortstory.doc") is shown. In the process 400, the second pattern string 412 is generated from the template string by substituting the substring ("shortstory"; indicated at 408) that matches the wildcard symbol indicated at 406 for the wildcard identifying symbol indicated at 410 in the template string. The substring that is thus substituted for the wildcard-identifying symbol may be termed the associated substring of that wildcard-identifying symbol. This substitution may, in some embodiments, be carried out by the matching module 112. Once the second pattern string 412 is generated, the file access module 110 may use the second pattern string 412 to identify a list of related files in the package 302. Since the second pattern string 412 is entirely a literal string with no wildcard symbols included within it, the list of related files 414 includes only the file having the same filename as the second pattern string 412, namely the file 316 of the example package 302 named shortstory.doc.ann.

A number of tools, programs, and packages exist to facilitate strong matching and processing as described in this specification. Some examples include C library functions (for example: http://www.boost.org/libs/regex/doc/index.html), the PERL language (http://www.perl.com/doc/manual/html/pod/perlre.html), Java library string functions (http://java.sun.com/j2se/1.5.0/docs/api/java/util/regex/package-summary.html), and XSLT patterns (http://www.w3.org/TR/xslt#patterns)

Figure 5:
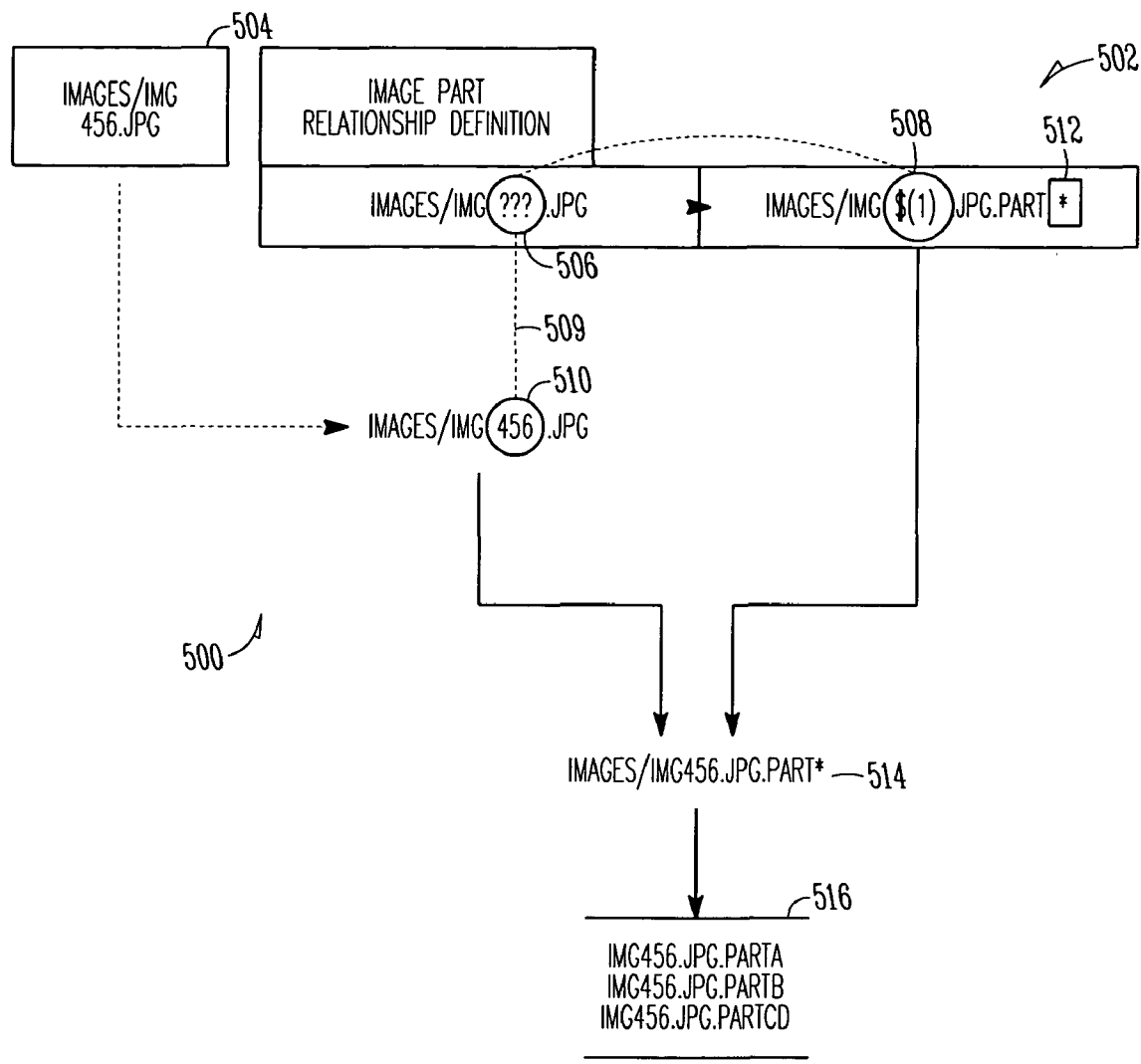
FIG. 5 is a another diagrammatic representation of a process for determining of a list of files related to a main file, according to an example embodiment.

FIG. 5 illustrates, as another example, a process 500 for identifying files in a package of data items (such as, for example, package 302) that are related to a given main file in a particular relationship, according to an example embodiment. The process 500 includes the identification of a number of image part files related to a first JPEG image file through a part relationship. This part relationship may be represented by a relationship definition 502. The relationship definition 502 may be stored in the relationship definition file 304 of package 302. The relationship definition 502 is an example of a relationship definition that represents a relationship between files in a subfolder (e.g., the "images" folder 320) of package 302, and yet may be stored in a relationship definition file 304 that is a top level data item of package 302. The representation of a relationship between files in a subfolder is facilitated by the use of relative path names in the first pattern string and the template string of the relationship definition 502. It will be appreciated that in some embodiments, full path names instead of or in addition to relative path names may be used in the strings included in relationship definitions.

For purposes of illustration, suppose that a web authoring application is being used to create an HTML document from electronic document file 310 and needs to identify several files providing identification of parts of an image file for the purpose of creating a clickable image map. In some embodiments, the web authoring application may require identification of the file names of the files representing image part definitions associated with a particular image file, such as, for example, img456.jpg, a JPEG image file illustrated in FIG. 5 at 504 and in FIG. 3 at 338.

To identify the image part definition files related to img456.jpg that are also in the images subfolder 320, the file accessing and/or processing module 108 of the web authoring application (such as for example application 102) may invoke an image part definition identification routine which may be carried out by the file access module 110 and the matching module 112. The file access module 110, may retrieve the file name images/IMG 456.jpg of the image file 504 and the relationship definition 502 representing the 'image part' relationship of interest. Thereafter, the matching module 112 may carry out several operations illustrated in FIG. 5. First, the matching module 110 may match the wildcard symbol (indicated by the ellipse 506) able to match a substring three characters long and in the position indicated in the first pattern string to a corresponding substring namely 456 as indicated by ellipse 510 in the file name of the image file 504. As with the relationship definition 402, relationship definition 502 includes a wildcard-identifying symbol indicated by ellipse 508 which corresponds (as indicated by dotted line 509) to the wildcard symbol indicated by ellipse 506. The template string also includes a wildcard symbol indicated by rectangle 512. The matching module 110 may determine that the main file name matches the first pattern string both as to the first pattern string's literal substrings (e.g., "images/image" and ".jpg") and as to the wildcard symbol (e.g., "???"). The matching module may next store the pairing of the wild card symbol indicated by ellipse 506 and the corresponding substring (e.g., "456", indicated by ellipse 510) of the main file name, in some embodiments, in the table 132 of the memory 104. The matching module 110 may then derive the second pattern string 514 by substituting the wildcard-matched substring from the main file name for the corresponding wildcard identifying symbol in the template string. In the process 500, the presence of a wildcard symbol in the second pattern string may allow a file access module 110 to match more than one related file names of files related to the main file from within the package 302. In the example process 500, three file names corresponding to three files within the images subfolder 320 match the second pattern string 514, by wild card substitution. These file names identify image part files that are related by the image part relationship to the image file img456.jpg.

Figure 6:
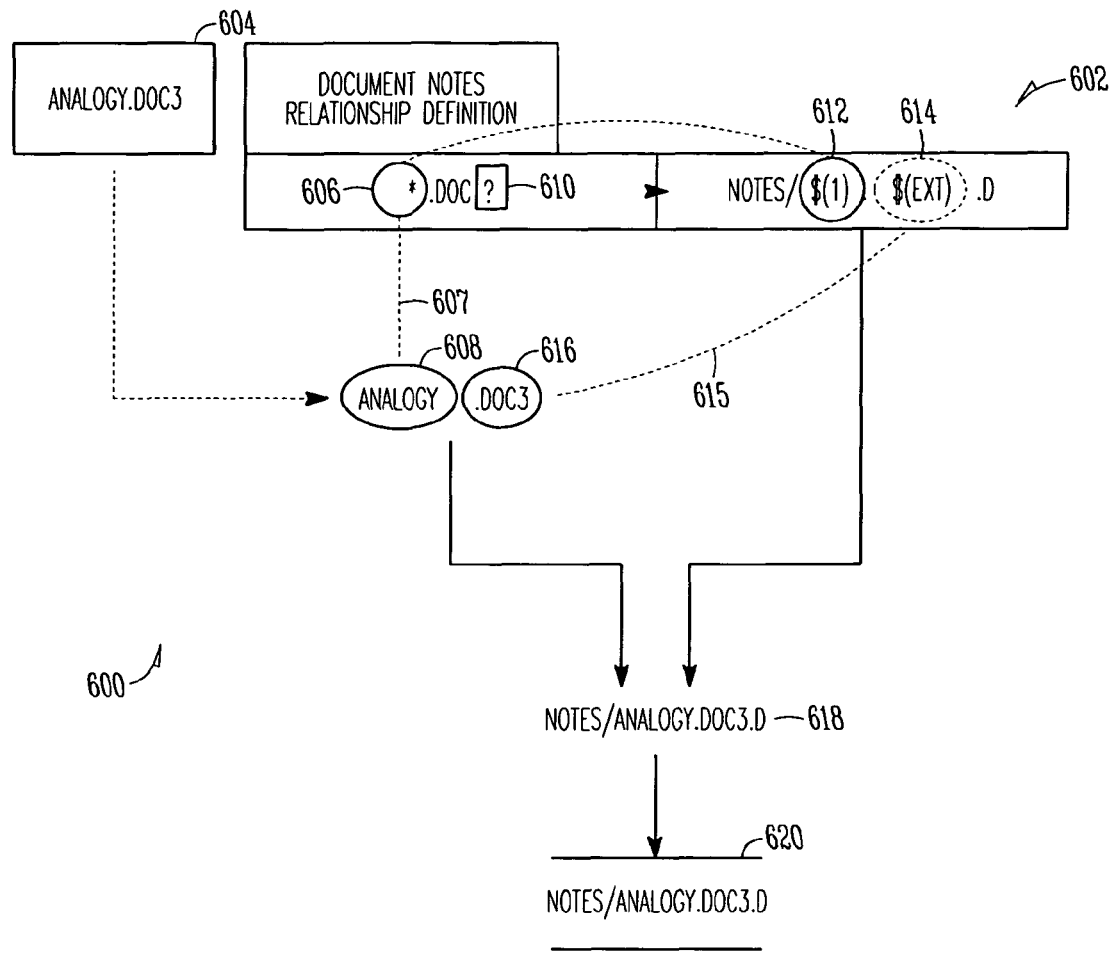
FIG. 6 is a further diagrammatic representation of a process for determining of a list of files related to a main file, according to an example embodiment.

FIG. 6 shows a further diagrammatic illustration of a process 600 for identifying a file related to a main file through the use of a pattern-based relationship definition, according to an example embodiment. A 'document notes' relationship definition 602, which may be contained in a relationship definition file 304, is used in this example to represent the relationship between a document note file and the document file to which it pertains. Suppose, for the purpose of illustration, it is desirable to determine a list of filenames of document notes files found within a package of data items such as package 302 where the document notes files are related to a particular document file such as, for example, document file 604 with the filename analogy.doc3 (also shown in FIG. 3 at 312.)

The relationship definition 602 (an example of which is also illustrated in FIG. 2 at 206) includes a first pattern string (e.g., "*.doc?") to match top level files in the package 302 to which the relationship definition 602 pertains, such as by inclusion in relationship definition file 304. The first pattern string of relationship definition 602 includes a wildcard symbol "*" indicated by ellipse 606 and able to match (e.g., as illustrated by dotted line 609) the root part (e.g., "analogy", indicated by ellipse 610) of a document file name. The first pattern string also provides for a match of the extension of the document file name in which the last character of the extension (e.g., as indicated by ellipse 616) matches with a single character wildcard indicated by the rectangle 610. In the template string, a first wildcard identifying symbol $(1) indicated by ellipse 612 corresponds to the first wildcard symbol indicated by ellipse 606. The second wildcard symbol indicated by the rectangle 610 in the first pattern string is used for document file name matching purposes only (e.g., by matching the "3" character in the four-letter extension of a document file) and does not have a corresponding wildcard-identifying symbol in the template string. The template string does however include a name portion symbol $(ext) indicated by the ellipse 614.

While wildcard-identifying symbols in the template string may be replaced by the substrings of the main filename to which they match through the wildcard symbols in the first pattern string, name portion symbols may be replaced in the derivation of the second pattern string from the template string by identifying the substring of the main filename to which they correspond. In the example process 600, the name portion symbol $(ext) matches (e.g., as indicated by dotted line 615) the extension which in some embodiments may be the last part of a filename preceded by a dot, such as for example doc3 indicated by ellipse 616 of the document file name. In examining the second pattern string 618 derived from the template string, it will be appreciated that the first wildcard-identifying symbol indicated by ellipse 612 (e.g., "$(1)") is replaced in the second pattern string 618 with the substring "analogy" that matches the first wildcard symbol in the first pattern string. The name portion symbol $(ext) indicated by ellipse 614 in the template string is similarly replaced in the derivation of the second pattern string with the matching extension from the main filename (e.g., "doc3") indicated by ellipse 616. It will be appreciated that the relationship definition 602 relates document files from the top level of a package 302 to document notes files ending in a ".d" extension in a "notes" folder 322. Since the template string of relationship definition 602 does not include any wildcard symbols, only those files in the "notes" folder 322 that match the second pattern string 618 literally may be considered to be related according to the relationship definition 602 as a document notes file pertaining to the document file 604.

Many name portion symbols are possible that correspond to various portions of the main file name. In addition to the $(ext) name portion symbol described above, others include $(basename) corresponding to a non-extension portion of a main file name, which depending on implementation may match only the first portion of a file name (e.g., "specification" of a file name "specification.doc.2") or the portion of a file name before the last extension (e.g., "specification.doc" of a file name "specification.doc.2"), as well as $(pathname), file system path name of the file, and $(fullname), the full file name including path and file name.

Consider a file named "mydocument1.doc" stored in the "C:" disk drive of a computer running the Microsoft® WINDOWS® operating system. If the file was stored on the "C:" hard drive in a subfolder "writings" in a folder "my_documents" the full path name of the file may be "C:\my_documents\writings\mydocument1.doc", the base portion may be "mydocument1", and the directory path portion may be "C:\my_documents\writings\", or in some embodiments, "C:\my_documents\writings"

It will be appreciated that the number (e.g., 1 in $(1)) in a wildcard-identifying symbol, rather than the ordinal position of the wildcard-identifying symbol, indicates the ordinal position of the corresponding wildcard symbol in the first pattern string. It will be further appreciated that when a template string includes wildcard symbols of its own, the relationship between main files and related files may be one-to-many, while when a template string does not include wildcard symbol of its own but uses only wildcard-identifying symbols and/or name portion symbols, the relationship between main files and related files may be one-to-one only. It is also possible for a template string to include only literal characters, suggesting a many-to-one relationship.

Figure 7:
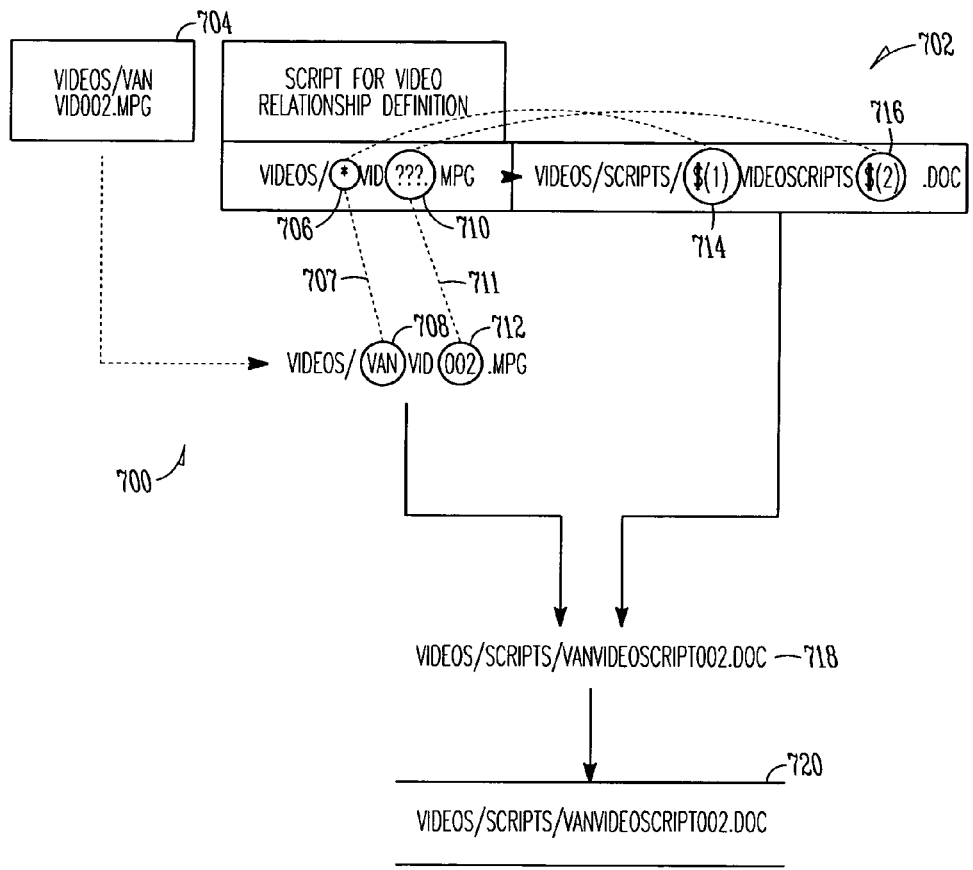
FIG. 7 is a yet further diagrammatic representation of a process for determining of a list of files related to a main file according, to an example embodiment.

FIG. 7 provides a yet further example of the use of a relationship definition to represent the relationship between main files and related files and the identification of related files related to a main files, according to an example embodiment. The example of FIG. 7, for sake of illustration, uses the relationship between MPEG movie files, and scripts or other similar documents associated with MPEG movie files. An example of such a "script of a movie"-type relationship definition is shown in FIG. 2 at 208 and reproduced in FIG. 7 as 702. The process illustrated in FIG. 7 is denoted generally as 700. In the example process 700, a video script document file such as 334 of FIG. 3 residing in a scripts subfolder 324 may be identified as related to an MPEG video file 330 stored in the "videos" folder 318 of a package 302, which includes a relationship definition file 304 containing the 'script for video' relationship definition 702. For the purposes of providing an example context for the process 700, consider a video editing and viewing application able to display or otherwise manipulate videos such as those illustrated as contained in the "videos" folder 318 of package 302. Suppose further that a button or other clickable item is associated (e.g., via a user interface) with the video file 704 to allow a user of the video editing application to open a document containing the corresponding script document file for that video. In the example package 302, there may be a convention that the first part of the filename of a video file provides an identification of the producer or creator of the video file followed by the literal string "vid", followed by a three character suffix such as sequence number finally terminated by the ".mpg" extension indicating that the video file is an MPEG file. Further suppose, for example, that the script document files associated with the videos are stored in a "scripts" subfolder 324 and have the naming convention that the first part of their file name is an indication of the producer or creator of the video followed by the literal string "videoscript" and then the corresponding suffix, and the file extension .doc.

In the process 700, the "script for video" relationship definition 702 may be used to identify video scripts that are related to a particular video file such as video file 704. Given a video file 704, the relationship definition 702 may be used by matching module 112 to match a filename of a video file 704 with the first pattern string of the relationship definition 702. This first pattern string includes two wildcard symbols, the first wildcard symbol indicated by ellipse 706 being useable to match (e.g., as indicated by dotted line 707) the prefix of the video filename (such as, e.g., the prefix "VAN") indicated by ellipse 708. The first pattern string may include a second wildcard symbol. In this example, the second wildcard symbol (e.g., "???") indicated by the ellipse 710 may be used to match (e.g., as indicated by dotted line 711) the three character suffix (e.g., "002") in a video file name such as that of video file 704. These two wildcard symbols correspond to the wildcard-identifying symbols $(1) indicated by ellipse 714 and $(2) indicated by ellipse 716 of the template string, respectively. It will be appreciated that the order of the wildcard-identifying symbols in the template string may be independent from the order of the corresponding wildcard symbols in the first pattern string. Rather, each wildcard-identifying symbol may identify the wildcard symbol in the first pattern string it corresponds to. The numerical convention exemplified in FIGS. 4 through 8 is one example of such and identification technique.

The second pattern string 718 may be derived from the template string by the substitution of the substrings of the filename (e.g., "VAN" and "002") for the wildcard identifying characters in the template string. As in some previous examples, since the template string does not include any wildcard symbols itself, the second pattern string 718 is itself the candidate related filename. Accordingly, the list of video script files 720 related to the video file 704 includes only one filename. In processes for determining whether one or more files are related to a first or main file, it may be determined that in fact no files in a package of data items (such as, for example, package 302) are in fact related to a particular main file even when the main filename in fact matches the first pattern string of the relationship definition.

It will be appreciated from the foregoing discussion that any number of wildcard symbols may appear in the first pattern string and thus any number of wildcard-identifying symbols may appear in the template string. In addition, some wildcard symbols in the first pattern string may not correspond to any wildcard-identifying symbols in the template string and may be used only for matching purposes. In addition, any number of wildcard symbols may appear in the template string and thus in the second pattern string to allow the matching between the second pattern string and multiple files related to the main file.

Figure 8:
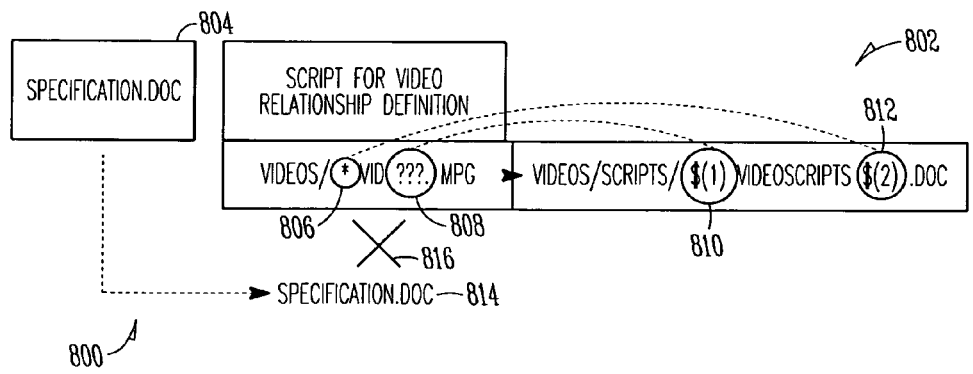
FIG. 8 is a diagrammatic representation illustrating a failed attempt to match the main filename of a main file using a relationship definition whose first pattern string does not match the filename of the first main file, according to an example embodiment.

As alluded to above, instead of successfully matching a main filename, the first pattern string of a relationship definition need not match a first filename. FIG. 8 illustrates such a failure of matching. In FIG. 8, a document file (e.g., named "specification.doc") residing in the top level of package 302 is illustrated at 804. An attempt to determine a video script for a video that matches the document in the file 804 will fail because the filename of the document ("specification.doc") cannot match the first pattern string applicable to a video file ("videos/*vid???.mpg"). This failure is illustrated by the large X glyph 816 where, in previous figures, the matching between substrings of the main file name and wildcard symbols in the first pattern string are illustrated. In some embodiments, when a matching module 112 determines that no match is possible, the application or the module invoking the matching module 112 may receive a "no match"-type message with respect to the particular relationship definition. For example, in some embodiments, it may be an error to try to determine one or more related files according to a particular relationship definition when the file name of a main file does not match the first pattern string of the relationship definition selected or identified by the invoker of the process.

Example Methods Illustrated by Flowcharts

A number of methods for identifying related files that are related to a given main file, according to example embodiments, are described below.

Figure 9:
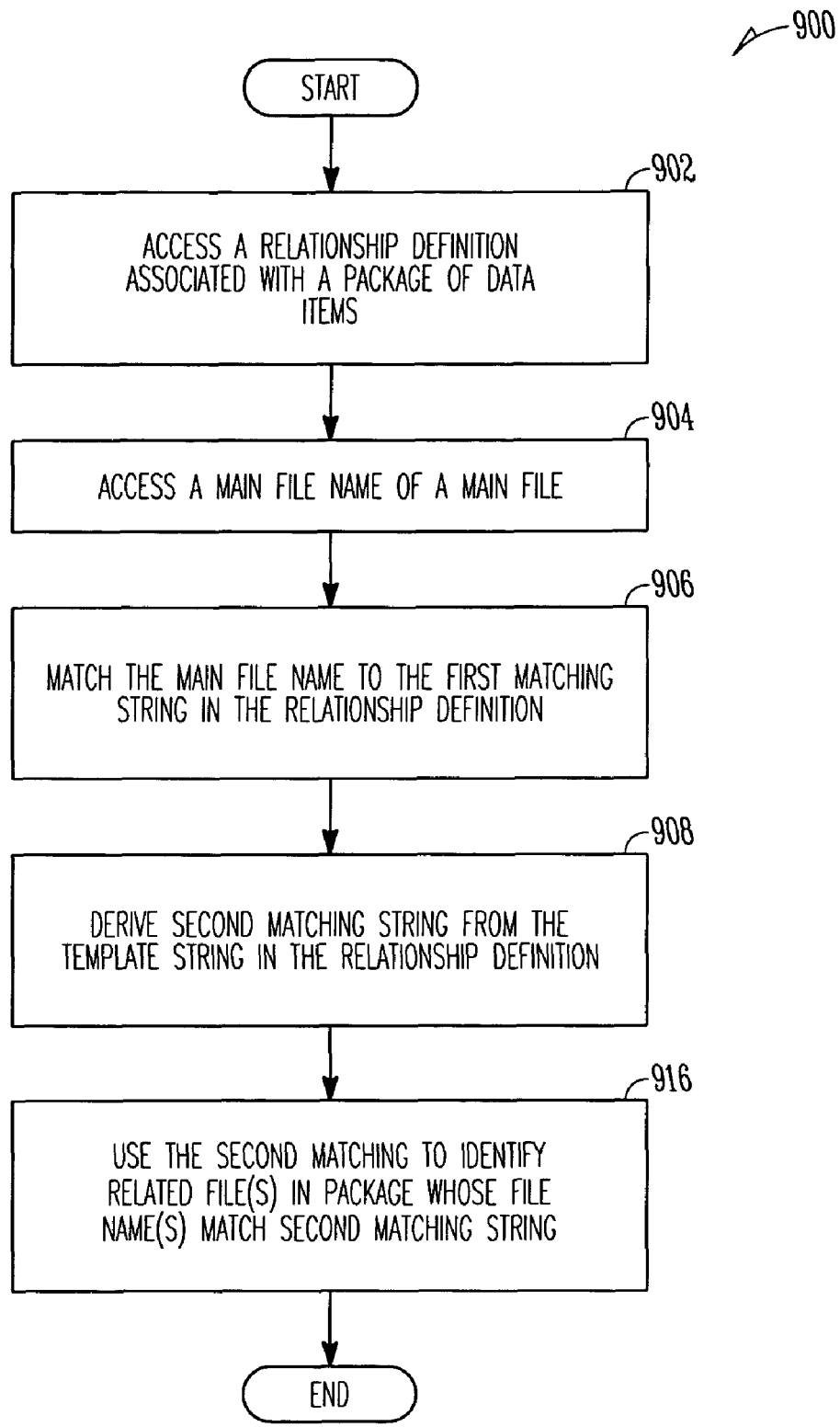
FIG. 9 is an overview flowchart for a process making use of a relationship definition to identify files in a package related to a main file, according to an example embodiment.

FIG. 9 illustrates an example flowchart of a process 900 for identifying related files in a package (e.g., a package 302) that are related to a main file, according to an example embodiment.

At block 902, a relationship definition, which may be included in the relationship definition file 304 associated with a package, for example, 302 of data items may be accessed. This accessing may be carried out by a file access module 110. At block 904, a main file name is accessed corresponding to a main file. This access may also be carried out by a file access module 110. At block 906, a matching module 112 or other component may match the main file name to the first pattern string associated with or included in the relationship definition such as 202. At block 908 the second pattern string is derived from the template string in the relationship definition such as relationship definition 202. The derivation in block 902 may also be carried out by a matching module 112. At block 916, the second pattern string is used to identify related files in package 302 whose file names match the second pattern string derived in block 908. The identification of these related files may be carried out by the file access module 110.

Figure 10:
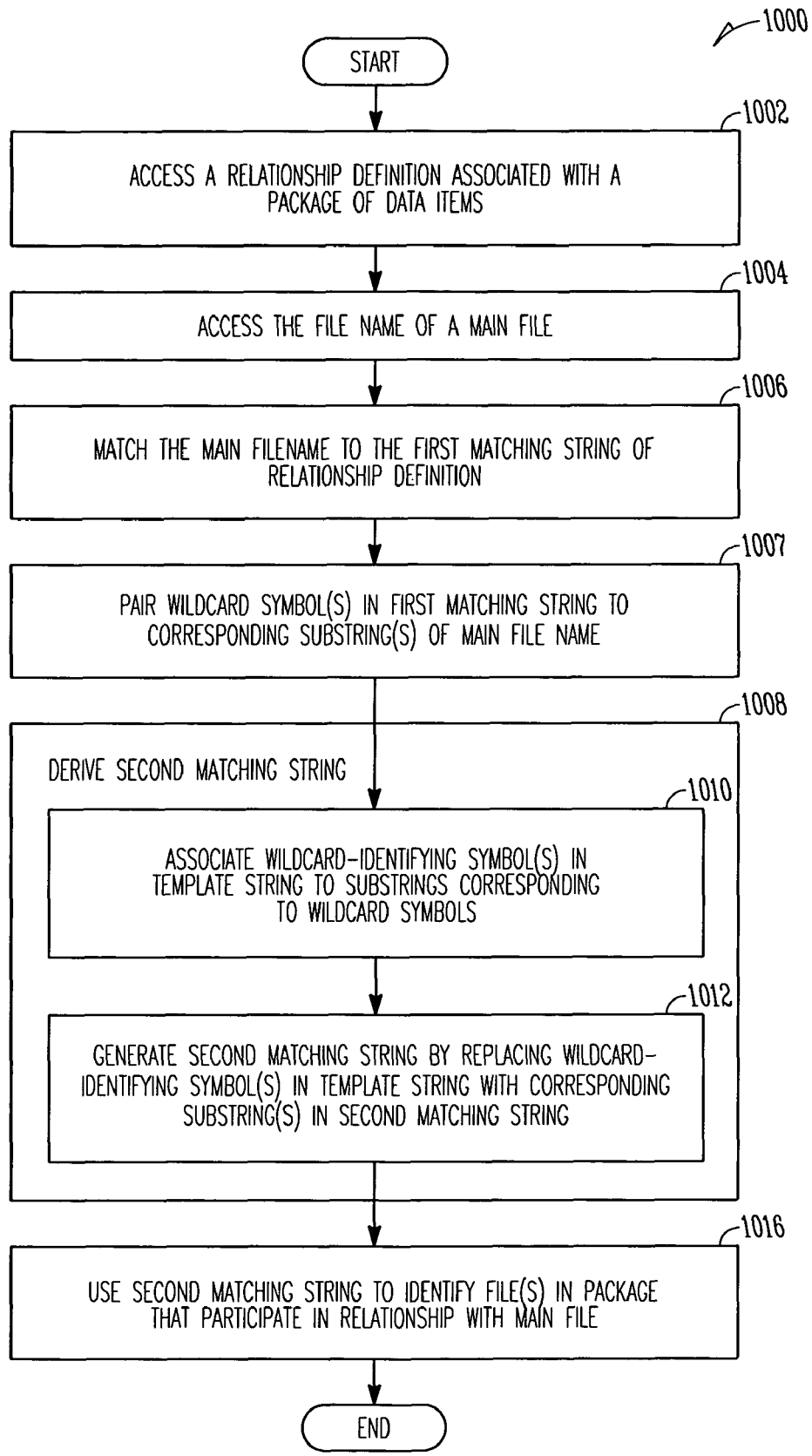
FIG. 10 is a flowchart for a process that may be used to identify files related to a main file in which wildcard symbols in a first pattern string associated with the relationship definition are used to match the main filename, according to an example embodiment.

FIG. 10 illustrates in a more detailed flowchart a process 1000 for identifying related files in a package 302 that participate in a relationship with a main file, according to an example embodiment. At block 1002, a relationship definition associated with a package of data items such as package 302 is accessed. This relationship definition may be included in a relationship definition file 304. The processing at block 1002 may be carried out by file access module 110. At block 1004, the file access module 110 may access the file name of the main file and at block 1006 the matching module 112 may match the main file name to the first pattern string of the relationship definition that was accessed in block 1002. Block 1006 may be carried out by the matching module 112.

At block 1007, the matching module 112 may pair the wildcard symbols in the first pattern string in the relationship definition (such as, for example, relationship definition 206) in the first pattern string corresponding substrings of the main file name. The pairing in block 1007 may be carried out by the matching module 112 with the pairings stored in memory 104, in table 132.

At block 1008, the matching module 112 may derive a second pattern string. The processing in block 1008 may include the two operations illustrated in block 1010 and 1012. In block 1010, the wildcard-identifying symbol or symbols in the template string are associated with substrings corresponding to the wildcard symbols, the substrings being from the first file name. In block 1010, the second pattern string is generated by replacing, into the second pattern string, the wildcard-identifying symbols in the template string with the corresponding substrings. As at block 1008, the processing of block 1010 and 1012 may be carried out by the matching module 112 by consulting the wildcard to substring mapping table 132.

Finally at block 1016, the second pattern string is used to identify the files in the package such as package 302 that participate in a relationship with the main file, as described above. If the second pattern string includes wildcard symbols of its own, multiple files may be identified that participate in the relationship represented by the relationship definition.

Figure 11:
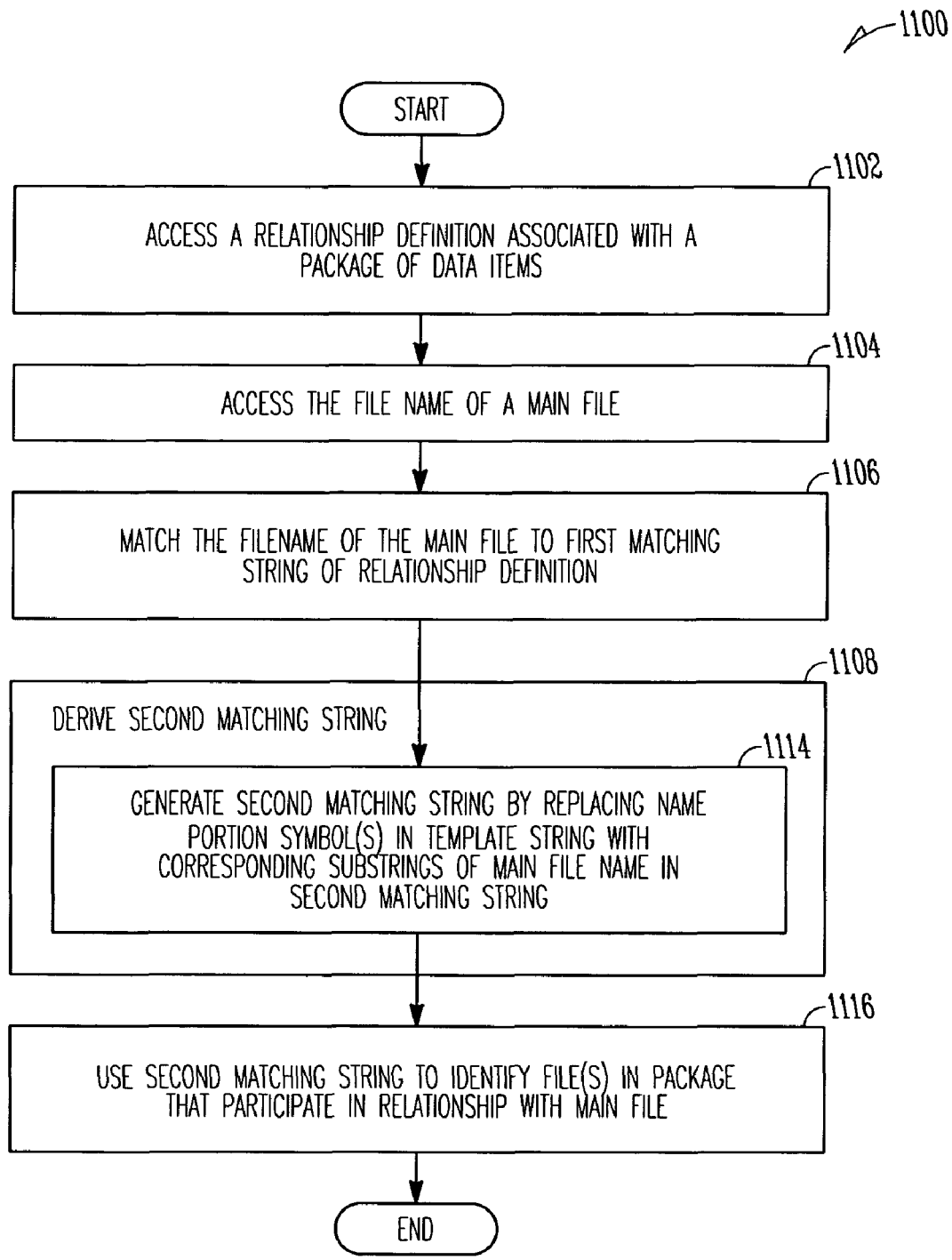
FIG. 11 is a flowchart for a process for identifying files related to a main file where a template string associated with a relationship definition includes name portion symbols, according to an example embodiment.

FIG. 11 illustrates a flowchart of yet another process 1100 for identifying files in a package (e.g., package 302) that participate in a relationship with a main file, according to an example embodiment. At block 1102, a relationship definition associated with a package of data items such as packages 302 is accessed and at block 1104, the file name of a main file, for which related files are to be identified and participate in a relationship with the main file, is accessed.

At block 1106, the main file name is matched to the first pattern string of the relationship definition and at block 1108, a second pattern string is derived. The process of deriving a second pattern string may include the processing carried out at block 1114 in which the second pattern string is generated by replacing name portion symbols in the template string with corresponding substrings of the main file name into the second pattern string. These name portion symbols may refer to such portions of the main file name as the extension, the base file name, the full path name, the path name only and other possible name portion symbols, as described in more detail above. The mapping from name portion symbols to portion strings of the main file name may be stored in memory 104 in table 130.

Finally at block 1116, a second pattern string is used to identify one or more files in the package that participate in the relationship with the main file to participate in the relationship with the main file as represented by the relationship definition. Once these related files have been identified, they may be accessed by other modules or applications for rendering or other processing.

Figure 12:
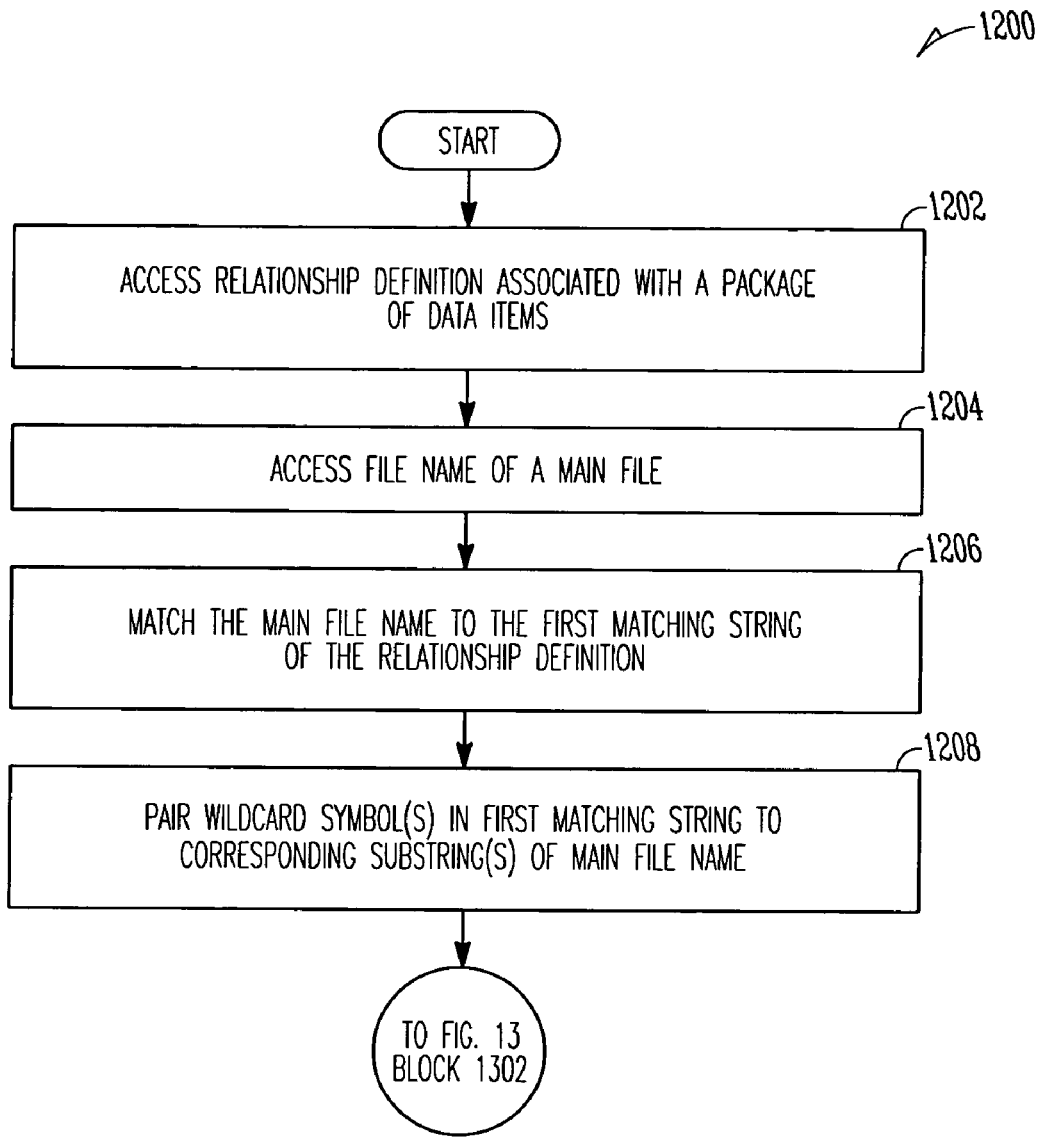
FIGS. 12 and 13 together are a flowchart for a process to identify files related to a main file in which the first pattern string associated with the relationship definition includes wildcard symbols, and in which the template string associated with the relationship definition includes name portion symbols, according to an example embodiment.
Figure 13:
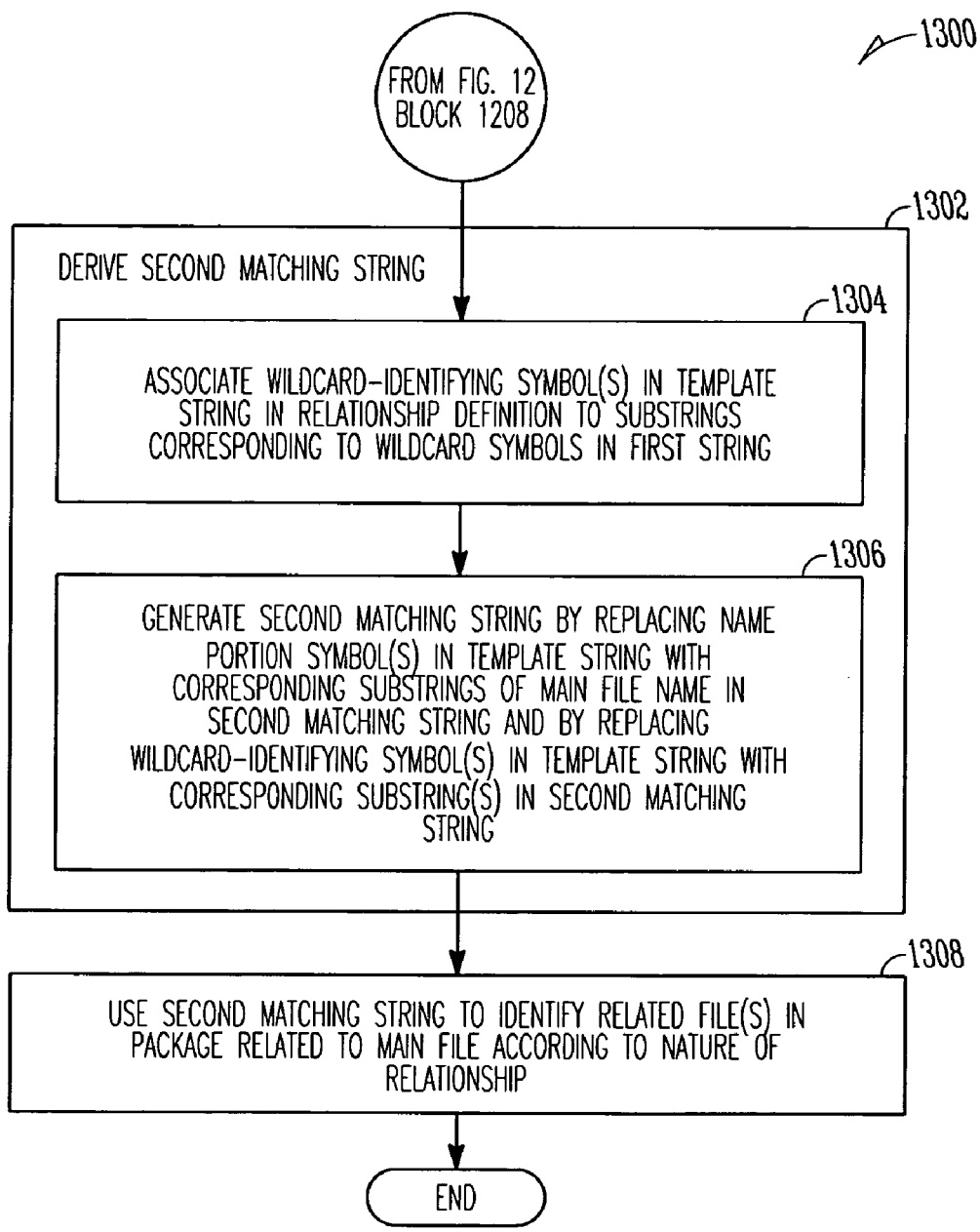

FIG. 12 and FIG. 13 taken together illustrate a yet further process 1200, 1300 for identifying related files in a package that are related to a main file according to the relationship represented in a relationship definition associated with the package, according to an example embodiment. At block 1202, a relationship definition associated with the package such as, for example, package 302 is accessed. This relationship definition may, in some embodiments, be loaded into memory 104 by the file access module 110.

At block 1204, the file name of a main file may be accessed and may also stored into memory 104 by the file access module 110. At block 1206 a matching module 112 may retrieve the main file name from memory 104 and match the main file name to the first pattern string of the relationship definition, which the matching module 112 may also retrieve from memory 104. At 1208, the matching module 112 may pair the wildcard symbols in the first pattern string to the corresponding substrings of the main file name and, in some embodiments, may store the mapping from wildcard symbols to substrings in the table 132. At this point, the process continues to FIG. 13, block 1302.

At block 1302, the matching module 112 may derive a second pattern string by using the relationship definition and the wildcard matching stored in memory 104 in Table 132. At block 1304, the matching module 112 may associate the wildcard-identifying symbol or symbols in the template string in the relationship definition with the substrings corresponding to the wildcard symbols. In the first string, this association may be carried out with reference to the table 132.

At block 1306, the second pattern string may be generated by replacing, into a second pattern string, any name portion symbols in the template string with corresponding substrings of the main file name and any wildcard-identifying symbols in the template string with corresponding portions of the main file name. The matching module 112 may store the mappings from name position symbols found in the template string to portion strings of the main file name in a table 130 in memory 104. Finally at block 1308, the second pattern string may be used, for example, by the file access module 110 to identify related files in the package, the related files being related to the main file according to the nature of the relationship as represented by the relationship definition.

Figure 14:
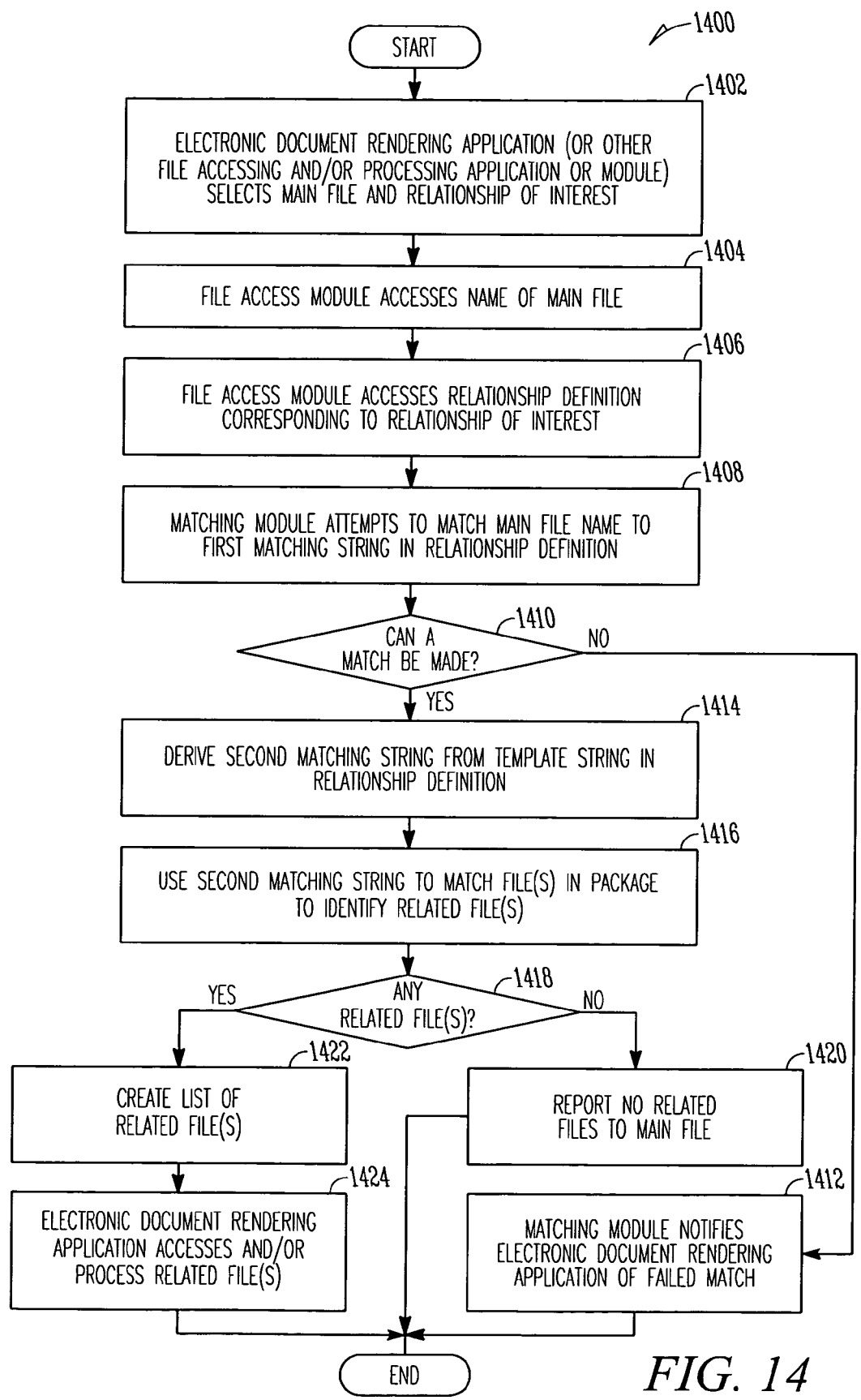
FIG. 14 is a flowchart showing a process by which an electronic document rendering application or other application or module may use a file access module and a matching module to identify a list of files related to a main file in a relationship of interest, according to an example embodiment.

FIG. 14 shows a flowchart illustrating the integration of the process 1400 for identifying related files related to a main file by a relationship represented by a relationship definition, according to an example embodiment. At block 1402, an electronic document rendering application or other application that may need to access or process files may select a main file and a relationship of interest such as, for example, a relationship that is contained in a relationship definition file 304 of a package 302. An example of such an electronic document rendering application may include file accessing application 102 or some other file accessing and/or processing module 108, considered separately from any file accessing application 102. The application 102 may make use of a file access module 110 to access the name of the main file, if the main file name is not already available to the application, and may communicate to the file access module 110 an indication of the relationship of interest. The file access module 110 may access the name of the main file at block 1404.

At block 1406, the file access module 110 may access a relationship definition corresponding to the relationship of interest as specified by, for example, the application 102. At block 1408, the application 102 may cause the matching module 112 to attempt to match the main file name to the first pattern string in the relationship definition retrieved by the file access module 110. In some embodiments, the matching module's attempted matching may be invoked via the file access module 110 on behalf of the application 102.

At decision box 1410, the matching module 112 may determine whether a match from the main file name may be made with the first pattern string in the relationship definition. If not, the matching module 112 may (at block 1412) notify the application 102 (such as, for example, an electronic document rendering application) that a match between the main file name and the first pattern string of the relationship definition failed. On the other hand, if the matching module 112 determines that a match can be made processing, continues at block 1414.

At block 1414, the matching module 112 may derive a second pattern string from the template string in the relationship definition as detailed in previous sections of this specification. Once the second pattern string has been derived, the second pattern string may be used, for example, by the file access module 110 to match files in the package (such as package 113) to identify files related to the main file.

At block 1418, the file access module 110 may determine whether there are any related files that match the second pattern string. If not, processing may continue at block 1420 in which the file access module 110 may report to the application 102 invoking the matching process that no related files to the main file were found in the package 113. On the other hand, if related files were found using the second pattern string, the file access module 110 may create a list of those related files at block 1422 and make them available to the application 102. At block 1424, the application 102 may access or otherwise process the related files returned in the list by the file access module 110. In some embodiments these files may be accessed on behalf of the application 102 by the file access module 110, or by a different file accessing facility.

Figure 15:
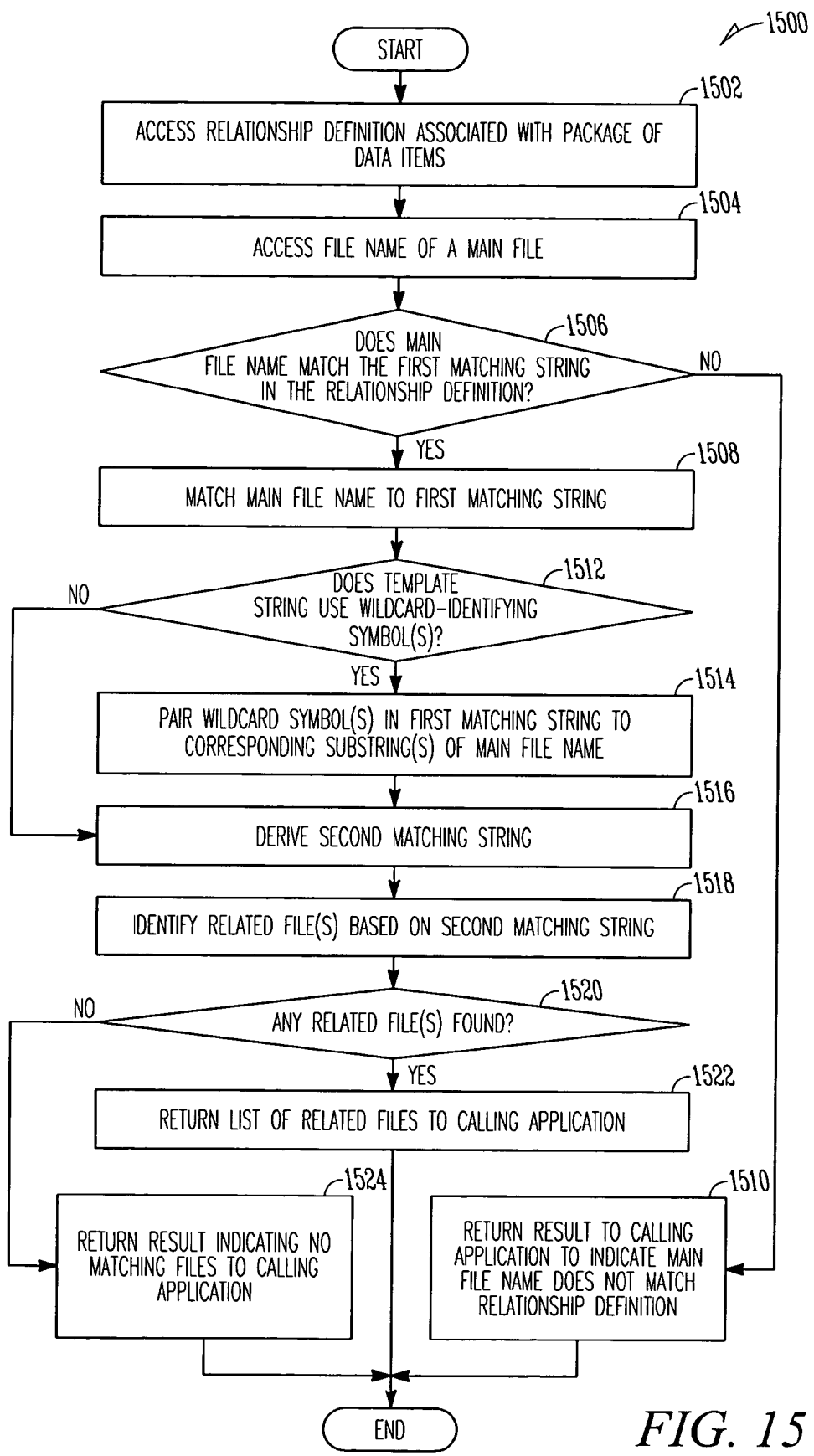
FIG. 15 is a flowchart showing a process for identifying a list of files related to a main file and making that list available to a calling application, according to an example embodiment.

FIG. 15 shows a flow chart that illustrates yet another further example process 1500 for attempting to identify related files that relate to a main file and reporting the results of the attempt to an application 102. At block 1502, a relationship definition associated with the package of data items is accessed, and a file name of the main file to which related files may be related is accessed at block 1504. At decision box 1506, a determination is made as to whether the main file name matches the first pattern string of the relationship definition. If it does not, processing may continue at block 1510 where a result may be returned to the calling application to indicate the main file name does not match the relationship definition, in some embodiments, the relationship definition selected by or indicated by the application 102. On the other hand, if the main file name does match the first pattern string, the first pattern string may be matched to the main file name at block 1508. At decision box 1512, a determination may be made as to whether the template string uses wildcard-identifying symbols. If not, processing may continue at block 1516 with the derivation of the second pattern string.

On the other hand, if the template string does use wildcard-identifying symbols, the wildcard symbols in the first pattern string may be paired to the corresponding substrings in the main file name and in some embodiments may be stored in memory 104 in table 132 for substitution into the second pattern string during the derivation at block 1516.

Once the second pattern string has been derived at block 1516, processing may continue at block 1518 to identify the related files in the package such as package 113 that are related to the main file based on the second pattern string. If no related files are found that match the second pattern string as determined at decision box 1520, processing continues at block 1524. A result may be returned to the calling application 102 indicating the list of matching files is empty or that there are no matching files. On the other hand, if files matching the second pattern string are found at block 1518, then decision box 1520 may allow the determination that there are related files related to the main file, and at block 1522 the list of those related files may be returned to the application 102 (which may have called or invoked the process 1500) for further processing, access, or other activities.

It will be appreciated that throughout the specification that various embodiments have been discussed in terms of main files matching the first pattern string of various relationship definitions and the use of the template string of the various relationship definitions to determine or identify files related to the main file. This directionality of the relationships discussed (e.g. from main file to related files) are suggested by the rightward pointing triangle glyphs dividing the two parts of relationship definition representations such as the relationship definitions 202, 204, 206 and 208 of FIG. 2. In some embodiments it may be desirable for relationships represented by relationship definitions in a relationship definition's file to be bidirectional relationships. If that is the case, the author or implementer of the relationship definition file may place two separate relationship definitions into the relationship definition file representing the two directions of each relationship.

In some embodiments, reverse relationships may be derived from the forward-directional relationships in a relationship definition file.

The derivation of a reverse relationship definition from a forward relationship definition may be carried out by swapping the wildcard-identifying symbols in the template string with the corresponding wildcard symbol in the first pattern string and reversing the roles of the first pattern string and the template string. However, relationship definitions that include file name portion symbols in the template string may not be susceptible to mechanical derivation of the corresponding reverse relationship definition.

In some embodiments, it may be desirable to create a listing of all the relations that may exist between all files in a package of data items. To create such a listing, a process may be carried out that attempts to traverse all the files in a package (e.g., package 302) and for each file in the package and for each relationship definition in the relationship definition file 304, use a method, such as those presented above, to determine all files related according to each file according to each relationship definition and thereby create a comprehensive list of all relationships among files in the package 302.

Example Hardware and Computer Systems for Implementing Example Processes

Figure 16:
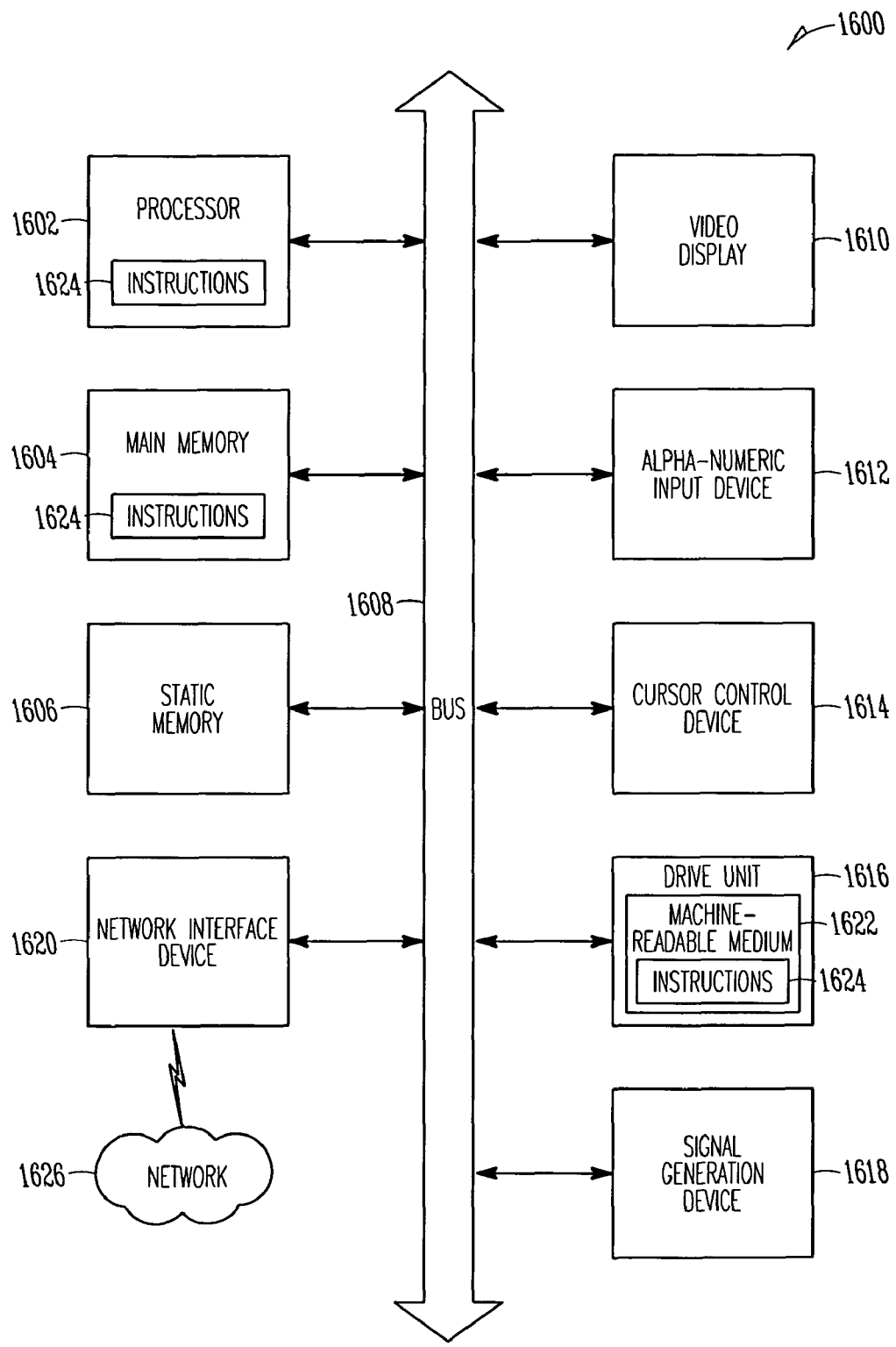
FIG. 16 shows a diagrammatic representation of machine in the example form of a computer system within which a set of instructions, for causing the machine to perform any one or more of the methodologies discussed herein, may be executed.

FIG. 16 shows a diagrammatic representation of machine in the example form of a computer system 1600 within which a set of instructions, for causing the machine to perform any one or more of the methodologies, methods, processes, or procedures discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1600 includes a processor 1602 (e.g., a central processing unit (CPU), a graphics processing unit (GPU) or both), a main memory 1604 and a static memory 1606, which communicate with each other via a bus 1608. The computer system 1600 may further include a video display unit 1610 (e.g., a liquid crystal display (LCD) or a cathode ray tube (CRT)). The computer system 1600 also includes an alphanumeric input device 1612 (e.g., a keyboard), a user interface (UI) navigation device 1614 (e.g., a mouse), a disk drive unit 1616, a signal generation device 1618 (e.g., a speaker) and a network interface device 1620.

The disk drive unit 1616 includes a machine-readable medium 1622 on which is stored one or more sets of instructions and data structures (e.g., software 1624) embodying or utilized by any one or more of the methodologies or functions described herein. The software 1624 may also reside, completely or at least partially, within the main memory 1604 and/or within the processor 1602 during execution thereof by the computer system 1600, the main memory 1604 and the processor 1602 also constituting machine-readable media.

The software 1624 may further be transmitted or received over a network 1626 via the network interface device 1620 utilizing any one of a number of well-known transfer protocols (e.g., HTTP).

While the machine-readable medium 1622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

A number of technical problems exist with respect to file relationship inference and representation. An example of a technical problem that may be solved by embodiments presented herein may include excessive amount storage space consumed by a relationship definition file in which every relationship in a package of data items is explicitly listed. Another example of a technical problem that may be solved by embodiments presented herein is that of the inefficiency of searching a relationship definition file that does not make use of pattern matching to find files or other data items related to a given data item or file.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   using a computing system including one or more machines, to perform one or more of the following acts,
   accessing a main file name of a main file;
   accessing a relationship definition file having at least one relationship definition associated with a package of data items, the at least one relationship definition identifying at least one class of relationships between data items included in the package of data items, the at least one relationship definition associating the main file with information stored in a related file, the at least one relationship definition including a template string; and
   accessing the related file by adding a portion of the template string to a portion of the main file name to generate a related file name, wherein the information stored in the related file is related to information contained in the main file, and wherein the information stored in the related file is for use in rendering the main file, by an electronic document rendering application, without altering the information contained in the main file.

2. The method of claim 1, wherein the portion of the main file name includes a first substring and a second substring, and wherein accessing the related file further comprises identifying a related file name that corresponds to the related file included in the package by:
   matching the first substring of the main file name to a first pattern string of the at least one relationship definition;
   substituting the second substring of the main file name into the first pattern string; and
   deriving the related file name by adding the first pattern string with the substituted second string of the main file name to the portion of the template string.

3. The method of claim 2, wherein the relationship definition records a relationship between the main file and the related file separately from the main file and the related file, and wherein the relationship definition is to facilitate associating the information stored in the related file to the main file without altering the information contained in the main file.

4. The method of claim 2 wherein:
   the first pattern string includes a first wildcard symbol, and
   the method further comprises substituting the second substring of the main file name into the first wildcard symbol in the first pattern string, and
   wherein the first wildcard symbol facilitates representation of a plurality of relationship instances using a single relationship definition.

5. The method of claim 1, wherein the template string includes a literal substring and wherein accessing the related file comprises copying the literal substring to generate the related file name.

6. The method of claim 1, wherein the at least one relationship definition includes a first pattern string, and accessing the related file comprises:
   substituting a substring of the main file name for a first wildcard symbol in a first pattern string; and
   substituting the first pattern string, including the substituted substring of the main file name, for a wildcard-identifying symbol of the template string t to generate the related file name.

7. The method of claim 6, wherein the template string includes a second wildcard symbol, and wherein accessing the related file further comprises accessing a plurality of related files, each having a unique related file name, by:
   adding a portion of the template string to a portion of the main file name to generate a second pattern string, the second pattern string including the second wildcard symbol of the template string, and
   accessing the plurality of related files using the second pattern string.

8. The method of claim 2, wherein the first wildcard symbol of the first pattern string is to match the first substring of the main file name, the first substring including at least one character.

9. The method of claim 8, wherein the first substring of the main file name includes a particular number of characters.

10. The method of claim 1, wherein information identifying a nature of a relationship is specified in each of the at least one relationship definition.

11. The method of claim 1, wherein the package includes a data structure selected from a group including a directory sub-tree and a compressed-directory sub-tree file.

12. The method of claim 1, wherein the main file is an electronic document.

13. The method of claim 1, wherein the main file includes a digital signature and the at least one relationship definition associates the main file with a second file created subsequent to application of the digital signature to the main file and without altering the main file.

14. The method of claim 1, wherein the main file is stored on a read-only medium.

15. The method of claim 1, further including selecting of the main file name by an electronic document rendering application.

16. A method comprising:
using a computing system including one or more machines, to perform one or more of the following acts,
accessing a relationship definition file having at least one relationship definition associated with a package of data items, the at least one relationship definition identifying at least one class of relationships between data items included in the package of data items, the at least one relationship definition associating the main file with information stored in a related file, the at least one relationship definition including a template string;
accessing a main file name of a main file;
accessing the related file by adding a portion of the template string to a portion of the main file name to generate a related file name;
and
identifying the related file, using the related file name, wherein the information stored in the related file is related to information contained in the main file, and wherein the information stored in the related file is for use in rendering the main file, by an electronic document rendering application, without altering the information contained in the main file.

17. A system comprising:
a plurality of modules, each module comprising instructions retained on at least one machine-readable storage medium, that when executed by a machine perform identified operations, wherein the modules comprise:
a file access module to access a main file name of a main file and to access a relationship definition associated with a package of data items, the relationship definition identifying a class of relationships between data items included in the package of data items, the relationship definition associating the main file with information stored in a related file, the at least one relationship definition including a template string and a first pattern string; and
a matching module to determine whether a first portion of the main file name matches the first pattern string and, based on the determination, selectively to:
match the main file name to the first pattern string;
substitute a second substring of the main file name into the first pattern string;
derive a second pattern string from the template string and the first pattern string having the substituted second substring of the main file name; and
identify a related file name that matches the second pattern string;
wherein the information stored in the related file is related to information contained in the main file, and wherein the information stored in the related file is for use in rendering the main file without altering the information contained in the main file.

18. The system of claim 17, wherein the file access module is to identify a related file name that corresponds to a related file included in the package and that matches the second pattern string.

19. The system of claim 18, wherein the relationship definition records a relationship between the main file and the related file separately from the main file and the related file, and wherein the relationship definition is to facilitate associating information stored in the related file to the main file without altering the main file.

20. The system of claim 17 wherein the first pattern string includes a first wildcard symbol, wherein the system facilitates representation of a plurality of relationship instances using a single relationship definition.

21. The system of claim 17, wherein the template string includes a literal substring and wherein the matching module is to derive the second pattern string by copying the literal substring to the second pattern string.

22. The system of claim 17, wherein the template string includes a second wildcard symbol.

23. The system of claim 17, wherein the template string includes a name portion symbol, the name portion symbol identifying a portion of the main file name, the matching module further, based on the determination, selectively to generate the second pattern string corresponding to the template string, the name portion symbol in the template string being replaced in the second pattern string by the portion of the main file name identified by the name portion symbol.

24. The system of claim 23, wherein the name portion symbol identifies a portion of the main file name, the portion selected from the group including a base portion of the main file name, an extension of the main file name, a full path name of the main file name, and a directory path portion of the main file name.

25. The system of claim 17, wherein the first wildcard symbol is to match a substring of the main file name, the substring including at least one character.

26. The system of claim 17, wherein the first wildcard symbol is to match a substring of the main file name, the substring including a particular number of characters.

27. The system of claim 17, wherein information identifying a nature of a relationship is associated with the relationship definition.

28. The system of claim 17, wherein the package includes a data structure selected from the group including a directory sub-tree and a compressed-directory sub-tree file.

29. The system of claim 17, further comprising an electronic document rendering application to select the main file name.

30. A machine-readable storage medium embodying instructions which, when executed by a machine, cause the machine to perform operations comprising:
accessing a relationship definition file having at least one relationship definition associated with a package of data items, the at least one relationship definition identifying a class of relationships between data items included in the package of data items, the at least one relationship definition associating a main file with information stored in a related file, the at least one relationship definition including a template string and a first pattern string;

accessing a main file name of the main file;

matching the main file name to the first pattern string; and deriving a second pattern string from the template string, wherein the information stored in the related file is related to information contained in the main file, and wherein the information stored in the related file is for use in rendering the main file, by an electronic document rendering application, without altering the information contained in the main file.

31. The machine-readable storage medium of claim 30, wherein accessing the related file comprises:

substituting a substring of the main file name for a first wildcard symbol in a first pattern string; and substituting the first pattern string with the substring of the main file name for a wildcard-identifying symbol of the template string, to generate the related file name.

32. The machine-readable storage medium of claim 30, wherein the template string includes a name portion symbol, the name portion symbol identifying a portion of the main file name, and wherein the machine-readable medium embodies further instructions which, when executed by a machine, cause the machine to perform the method wherein the deriving of the second pattern string comprises:

generating the second pattern string corresponding to the template string, the name portion symbol in the template string being replaced in the second pattern string by the portion of the main file name identified by the name portion symbol.

* * * * *